US008299343B2

(12) United States Patent
Copeland

(10) Patent No.: US 8,299,343 B2
(45) Date of Patent: Oct. 30, 2012

(54) G-PAN MUSICAL INSTRUMENT

(75) Inventor: Brian R. Copeland, San Fernando (TT)

(73) Assignee: Government of the Republic of Trinidad and Tobago, Port of Spain (TT)

( * ) Notice: Subject to any disclaimer, the term of this patent is extended or adjusted under 35 U.S.C. 154(b) by 24 days.

(21) Appl. No.: 12/826,072

(22) Filed: Jun. 29, 2010

(65) Prior Publication Data

US 2011/0162510 A1 Jul. 7, 2011

Related U.S. Application Data

(60) Division of application No. 12/171,634, filed on Jul. 11, 2008, now Pat. No. 7,750,220, which is a continuation-in-part of application No. PCT/TT2007/000001, filed on Jul. 13, 2007.

(30) Foreign Application Priority Data

Jul. 12, 2007 (TT) ................................ 2007/00172

(51) Int. Cl.
*G01D 13/02* (2006.01)

(52) U.S. Cl. .......................... 84/411 R; 84/406; 84/419

(58) Field of Classification Search ................ 84/411 R, 84/406, 419; D17/22
See application file for complete search history.

(56) References Cited

U.S. PATENT DOCUMENTS 4,214,404 A 7/1980 Fischer
5,814,747 A 9/1998 Ramsell
5,973,247 A 10/1999 Matthews
6,054,645 A 4/2000 Gauger
6,212,772 B1 4/2001 Whitmyre et al.
6,750,386 B2 6/2004 King
7,030,305 B1 * 4/2006 Cupid ........................ 84/411 R
7,745,711 B2 * 6/2010 Kerns et al. ..................... 84/402
7,750,220 B2 7/2010 Copeland
2004/0035283 A1 2/2004 King
2005/0109219 A1 5/2005 Minamigawa

FOREIGN PATENT DOCUMENTS

CA 1209831 8/1986
CH 693319 5/2003
DE 20013648 10/2000
TT 33 A 4/1976

(Continued)

OTHER PUBLICATIONS

International Preliminary Examination Report issued in corresponding PCT Application No. PCT/TT2007/000001, 10 pages.

(Continued)

*Primary Examiner* — Jianchun Qin
(74) *Attorney, Agent, or Firm* — Finch & Maloney PLLC

(57) ABSTRACT

An ensemble of acoustic steelpan musical instruments, being an innovation which significantly improves upon traditional acoustic steelpan prior art. Improvements include an extension of note range across the assemblage of G-Pans, a substantial reduction in the number of steelpans required to effectively cover the steelpan musical range, the use of a compound design whereby individual component parts of the instrument, specifically the playing surface, chime, rear attachment, or skirt and the playing stick or mallet, are optimized for their specific function, the application of a variety of techniques for eliminating or reducing non-musical sympathetic vibrations, and the inclusion of a variety of mechanical and acoustic resonator designs to enhance optimally the sound projection of the aforementioned instrument.

7 Claims, 13 Drawing Sheets

FOREIGN PATENT DOCUMENTS

TT 32 7/1983

OTHER PUBLICATIONS

International Search Report dated Apr. 16, 2008 issued in corresponding PCT Application No. PCT/TT2007/000001, 4 pages.

Snapshot from www.steeldrumshop.com, Aug. 19, 2007, 3 pages.

Gibson, Johanna, Don't steal the steelpan, Patenting Lives, Life Patents, Development and Culture, Aug. 23, 2008, 2 pages, http://patentinglives.blogspot.com/2008/08/dont-steal-steelpan.html.

* cited by examiner

Table 1

G-PAN MUSICAL INSTRUMENT

CROSS-REFERENCES TO RELATED APPLICATIONS

This application is a Divisional Application of U.S. patent application Ser. No. 12/171,634, titled "THE G-PAN MUSICAL INSTRUMENT," filed on Jul. 11, 2008, and issued as U.S. Pat. No. 7,750,220 on Jul. 6, 2010, which is a Continuation-In-Part of PCT Application Serial No. PCT/TT2007/000001, titled "The G-Pan Musical Instrument," filed on Jul. 13, 2007, which claims priority to Republic of Trinidad and Tobago Application Serial No. TT/A/2007/00172, titled "The G-Pan Musical Instrument," filed on Jul. 12, 2007. These applications are hereby incorporated by reference herein.

BACKGROUND OF THE INVENTION

1. Field of the Invention

This application relates to musical instruments and, in particular, to steelpan drums.

2. Description of the Related Art

The steelpan is considered as a traditional art form in the country where it has originated, namely the Republic of Trinidad and Tobago, where it has been proclaimed as the National Instrument. In its bearing on the evolution of the present invention, the prior art is completely defined by the conventional traditional acoustic steelpan musical drum instrument. The acoustic steelpan or traditional steelpan is an instrument which presents well-defined note playing areas of definite pitch, on one or more continuous metal note bearing surfaces, hereinafter also referred to as playing surfaces.

The heretofore mentioned instrument is played in percussive mode and was first invented in the island of Trinidad in the Republic of Trinidad and Tobago, some time in the late 1930s. The exact date of invention is unknown as the origins of the instrument are steeped in folklore, having been first fashioned by individuals who were mostly working class and generally technically illiterate. However, the first published report of the instrument was printed in the Trinidad Guardian newspaper on Feb. 6, 1940.

As forerunners of the present invention, the first steelpans were fashioned from the empty oil drums abandoned by the US army and are still largely made from what is known to those skilled in the art of steel container manufacture, as tight head cylindrical steel barrels or drums. Said drums are manufactured by cold rolling the top and bottom heads to the cylindrical body of the drum or barrel. The joint thus formed is known by those skilled in the art of steel container manufacture as a chime.

In its relation to the present invention, the playing surface is fabricated by first manually sinking and forming one of the drum heads with a hammer or impact tool and or press forming equipment. Musical note playing areas are then clearly defined on the note bearing surface by the formation of grooves. The aforementioned note bearing surface is then heat treated and cooled. Subsequently, the said note areas are tuned by carefully and skillfully hammering them into the required shape by a Pan Tuner, to create areas that produce musical notes of definite pitch when struck.

The cylindrical body of the original drum is retained to form what is known as the skirt of the steelpan but is cut to various lengths primarily to perform the role of an acoustic resonator. The circular playing surface typically ranges from 55.88 cm/22 in to 68.58 cm/27 in in diameter and the length of the skirt ranges from about 15.24 cm/6 in to 91.44/36 in. Larger and smaller sizes have been used but the implementations that have been adopted utilize the stated ranges presumably for reasons of ergonomics and performance facilitation.

In their influence on the development of the present invention, drums which are formed as described above, are grouped to form a variety of steelpan instruments to cover different parts of the musical range. As such, a steelpan instrument is a musical instrument in which the notes are distributed over a number of drums. The number of drums in a steelpan instrument is dictated by the limitations of the applicable laws of science that determine the size of note area required to resonate at desired musical note frequencies.

There are at least eleven steelpan instruments in the traditional steelpan family. The nine-bass steelpan consists of nine drums with three notes each for a total of 27 notes typically ranging from $A_1$ to $B_3$. The more common six-bass steelpan consists of six drums with three notes each for a total of 18 notes typically ranging from $A_1$ to $D_3$. Tenor bass steelpans consist of four drums to typically cover the range $G_2$ to $D_4$. Cello steelpans cover the baritone range and come in two varieties. The 3-cello steelpan typically covers the range $B_2$ to $G_4$ over three drums while the 4-cello steelpan typically covers the range $B_2$ to $D_5$ over 4 drums.

The quadraphonic steelpan is a recent innovation that uses 4 drums to cover the range $B_2$ to $B^{\flat}_5$. The double guitar steelpan uses two drums to cover the range $C^{\sharp}_3$ to $G^{\sharp}_4$. The double second steelpan uses two drums to cover the range $F_3$ to $B^{\flat}_5$. The double tenor steelpan uses two drums to cover the range $A_3$ to $C^{\sharp}_6$. The Low tenor uses a single drum to cover the range $C_4$ to $E^{\flat}_6$. The high tenor uses a single drum to cover the range $D_4$ to $F_6$. For historical reasons, an anomaly exists in the naming of the tenor pan which actually carries notes in the soprano range.

In order that the pan player may obtain good musical quality, the end of the stick or mallet that is used to contact the note bearing surfaces is covered, wrapped, or coated with a soft material, usually of the consistency of rubber. If the material used is too hard, the sound produced tends to become dissonant and harsh. If the material used is too soft, the sound produced becomes muffled. Thus the design of the stick determines the time that the stick remains on the note at the point of impact, defined as the contact time. Note partials that have frequencies with cycle periods shorter than the contact time are suppressed while those possessing frequencies with cycle periods longer than the contact time are not.

The playing surface of the very first steelpans was of a convex shape. However, this provided some difficulty in performance. As the instrument evolved, pannists and steelpan tuners showed strong preference for the concave shape which has now been adopted universally as the norm.

As it relates to the background art, in current steelpan designs, the playing surface is fashioned by hammering one flat end of the drum into a concave bowl, thus stretching the metal to the required depth and thickness. This said process is called "sinking." The sinking process reduces the thickness of the playing surface and adjusts the material elasticity to levels required to support the desired note range. The sunken surface is then separated from the rest of the drum by cutting the skirt at an appropriate distance beneath the rim of the sunken end. The other half of the drum is either discarded or used to make a separate steelpan.

Note bearing areas may now be demarcated, often by engraving grooves or channels between note areas with a punch. This step is not absolutely necessary and serves only as a means for pannists to easily identify note areas. What is more important is the degree of separation and isolation between the notes; this is essential to a good sounding instrument as it provides an acoustic barrier which reduces the transmission of vibration energy between notes thus improving the accuracy of the instrument. For the purpose of clarification, accuracy refers to the characteristic of the instrument which facilitates the production of the intended musical note and only the intended notes, when the pertinent note bearing area is excited.

Trinidad and Tobago patent No. 33A of 1976 (expired) to Fernandez, the “magno pan” was the result of magnetic tuning of steel drums by magnets contacted to each note in a particular way, so that when the magnets of different magnitudes are regulated to specific areas of the notes, the pans can be altered from one key to another key, by as much as two tones apart i.e. C to E, or E to C. The quality of tone can also be altered by regulation of the magnets. Trinidad and Tobago patent No. 32 of 1983 (expired) also to Fernandez, the “bore pan”, enhances the barrier by boring holes along the note area perimeter and heat treating the area around the note.

On the note bearing surfaces of the steelpan, note separation refers to the degree of isolation of one note from another; in poorly separated notes, a significantly large percentage of the energy imparted by a strike to one note is transmitted to another, so much so that the sound generated by the second note is discernible. Poor separation can result in unwanted excitation of groups of notes.

Consonance and dissonance are terms used to describe the harmoniousness and pleasantness of the composite sound produced when two or more notes are simultaneously excited, a distinct possibility on the steelpan on which multiple notes share the same surface and multiple notes can be accidentally excited through energy coupling as described above. Consonant tones sound pleasant while dissonant tones sound unpleasant. As such, the concept of consonance and dissonance is a bit subjective.

It is generally accepted that dissonance results when partials from two notes fall within a critical band of frequencies. Although the range of this band varies along the musical scale, it typically ranges from about 30 Hz to 40 Hz. Thus consonance and dissonance are directly related to musical intervals and, as such, there are levels of consonance that arise in any musical scale. In particular, in Western music, the consonance of musical intervals is graded in decreasing consonance or increasing dissonance.

Intervals corresponding to octave (most consonant), perfect fifth, perfect fourth are said to be in perfect consonance, while intervals corresponding to major sixth, major third, minor sixth and minor third are said to be in imperfect consonance. The most dissonant intervals, in decreasing levels of dissonance, are generally considered to be the minor second (most dissonant), major seventh, major second, minor seventh, and the tritone (augmented 4ths or diminished 5ths).

Dissonant sounds can be produced if some energy from a note that is struck is transmitted to another note that has overtones that are not in consonance with the struck note. It is for this reason that chromatic arrangements of notes on the playing surface are generally avoided as all notes will then be a minor second apart.

As it relates to the present invention, it must be emphasized that tuners capitalize on inter-note coupling to vary the overtones produced by each note. This is done by selective adjustment of tensions in the area between the notes and by judicious arrangement or layout of notes on the playing surface of the instrument to ensure that most of the coupling occurs between consonant groups of notes.

For the present invention, the note separation problem lies at the heart of the challenge of devising a note layout schema that determines the value and location of notes on a steelpan drum. A plurality of note layout schemas has been used over the years.

As it has affected the evolution of the prior art over the years, pannists have demonstrated preference for particular given physical note arrangements. The preferred arrangements are listed in standards published by the Trinidad and Tobago Bureau of Standards. Most notable of these is the fourths and fifths arrangement for use on the tenor steelpan which has been found to facilitate musical performance while minimizing dissonance on that said instrument. Adjacent notes on said layout, being generally the notes that will experience the greatest degree of energy coupling, are set to musical intervals of the octave, fourths or fifths, these being the four most consonant musical intervals.

After note demarcation, the drum is heated to about 300° C. to relieve the mechanical stresses developed in the sinking process. The steelpan is then cooled either quickly by quenching or more slowly in air. Variations in the heating process vary from one manufacturer to another. Next, individual notes are formed by careful hammering of the selected areas. Finer adjustments are made in the size and shape of the note areas to define the note pitch and partials. Tuning of the steelpan is an iterative process and is accomplished either by ear or with the aid of mechanical or electronic tuning devices.

The steelpan musical instrument of the prior art allows for some variation of timbre or voice because a tuner can individually tune the partials of any given note. This process is known as “harmonic tuning”. In essence, then, the steelpan is a mechanical means of implementing sound synthesis. Harmonic tuning also benefits the player who can thereby create further subtle variations in note timbre by striking of the note bearing surfaces in different locations.

For the prior art, the skirt of the said traditional acoustic steelpan takes the form of a tube or pipe, of diameter equal to the playing surface. Its role in effecting acoustic coupling and projection of the sound created by vibration of notes on the playing surface can be described by rigorous application of well known principles of acoustics. The required analysis is quite complex but can be simplified for the purpose of this document through consideration of two primary mechanisms.

Firstly, the steelpan drum can be modeled as a tube that is closed only on one end. This is known to those skilled in the discipline of acoustics as a closed-open tube and displays resonances characteristic of the air enclosed in the barrel. An ideal closed-open tube has a fundamental resonance at $$f_1 = \frac{v}{4(L + 0.3d)}$$

where d is the tube diameter, L the tube length and v the velocity of sound in air. The factor 0.3d is an end correction factor used to compensate for dispersion of the sound at the end of the tube. The factor L+0.3d therefore corresponds to a ¼ wavelength of the fundamental resonance frequency.

In its bearing on the prior art, what is of significance to the steelpan, is the fact that the ideal closed-open tube also displays resonance peaks at odd multiples of the fundamental resonance frequency and resonance nulls at even multiples of the fundamental resonance frequency. In practice, the frequency response of a tube will display maxima at odd multiples of the fundamental resonance frequency and minima at even multiples of the fundamental resonance frequency.

The strength of the displayed resonances and correspondingly, the difference between frequency response maxima and minima, become more pronounced as the ratio of radius to skirt length decreases. As such, the contribution of the resonance effect increases for steelpans of lower pitch that typically carry long skirts.

In addition, sound is propagated from the walls of the skirt itself in response to acoustic energy transferred from the playing surface through the rim to the skirt. Whereas the skirt is naturally characterized by its own modal behavior defined by characteristic modal frequencies at which it resonates, it would also vibrate at the frequencies produced by the note bearing areas on the playing surface as well. The strength of these vibrations would depend on how hard the notes are struck and how close the component frequencies of the resultant vibrations on the playing surface are to the resonant frequencies of the skirt.

Frequency components that are closest to a skirt resonant frequency will tend to experience greater amplification in vibration level than those that are not. The net contribution to the sound field by the skirt would be as a result of the composite effect of these vibrations over the entire area of the skirt. In particular, although vibration levels at any given point of the skirt would generally be small, the resultant contribution over the large surface area of the skirt would lead to a level of sound that is quite discernible.

For the high tenor steelpan, the skirt of the drum from which the pan is made is cut to a length of 11.60 cm/4 in to 15.24 cm/6 in. The length of this aforementioned skirt increases as one goes down the musical range, reaching a typical length of 86.36 cm/34 in for the six-bass. In the final stage of the process the said instrument is given a protective coat. This may include paint, an electroplating finish, usually nickel or chrome, or sprayed and baked plastic finish. Minor adjustments in tuning are often required after this process.

The perimeter of the said playing surface of the steelpan, which is called the rim in the steelpan fraternity on the traditional acoustic steelpan, corresponds to what is known as the chime by those skilled in drum and barrel container manufacture and is made by crimping or rolling the materials comprising the playing surface and skirt. When the playing surface of a traditional steelpan is struck during a performance, some of the impact energy excites one or more torsion modes of the drum. For the 55.88 cm/22 in diameter drums used on most traditional steelpans, with the rim as described above, said torsional vibration has a subsonic frequency component of about 15 Hz. Said vibration is significant for normal performance impacts and can actually be felt when one touches the rim of the instrument.

The consequent fluctuating shape distortion of the playing surface on the traditional steelpan drum due to the torsion mode of vibration is largely responsible for the changes in note pitch frequency which occur at times, particularly on the notes closest to the edge of the playing surface, and therefore negatively affects note clarity and accuracy. Moreover, traditional steelpans go out of tune if the rim of the instrument is distorted due to stress caused by an externally applied force or temperature changes.

By dint of a paradigm shift, the invention and ongoing development of the steelpan musical instrument, apart from fostering the export of the steelpan instrument from a developing country to many first world countries has ushered in a new era of metallurgical technology globally. Until its invention in Trinidad and Tobago in the 1940s, musical instruments made from steel shells and steel plates were relegated for use only as rhythmic instruments such as gongs, cymbals and bells.

Dynamically however, the advent of the steelpan musical instrument has added to the global repository of metallurgical technological knowledge, by demonstrating convincingly that it is possible to produce high quality melodic tones, through controlled deformation and treatment of steel sheets and meticulously careful design of the sticks or mallets used for performance, in the striking of respective note bearing surfaces. The term “steelpan technology” has been coined in Trinidad and Tobago out of the dire need to codify and encapsulate the complex metallurgical processes involved.

There are many easy and obvious extensions to the traditional practice of steelpan fabrication. The instrument needs not be fashioned from an oil drum as was done traditionally. Indeed the entire instrument can be made from sheets of metal by fashioning and attaching a metal top, which will ultimately form the playing surface, to an appropriately shaped support. Attachment can be achieved by welding or crimping, for example. Sinking can and has been achieved by a variety of standard industrial processes such as hydro-forming or spin-forming.

Despite its novelty and appeal, the traditional acoustic steelpan instrument suffers from several disadvantages. Firstly, the musical range of each steelpan in the traditional family of steelpans is typically less than three octaves. This is a limitation, particularly for soloist performances that is often compensated for by transposition of portions of a composition, the required notes of which fall outside the range of the instrument being played. In addition, some performers make up for this deficiency by simultaneously performing with two different steelpan ranges.

Furthermore, as existing steelpans evolved in a generally ad hoc manner, dependent upon need, there is an apparent clutter due to the fact that at least eleven instruments were required to cover the entire musical range. This clutter is further compounded when one considers the plethora of variations in note layout styles.

Said variations in note layout styles also contribute to the difficulty experienced by individuals, who may wish to play a wide range of steelpan instruments in an orchestra. Moreover, it works against player mobility, said mobility being the ability of a player to play in different steelpan orchestras which have steelpans with differing note layouts.

The traditional method for acoustic steelpan manufacture, relies on the steel container manufacturing industry for its primary raw material, said raw material being a finished used or unused steel drum, usually of the 55 gallon variety. However, drums made by said steel container manufacturers are designed strictly for the container market for which the primary concern is the ability of a drum to resist bursting when subjected to impact stress. As such, said manufacturers are less concerned with the metallurgical properties of the steel used to manufacture drums, than they are with its tensile strength. As such, the steel used in traditional manufacture can have widely varying metallurgical characteristics, such as Carbon content, grain size and purity, required to make a high quality steelpan musical instrument. This clearly impacts on the variation of musical quality of the steelpan instrument made from such drums.

In addition, as traditional drums are largely manufactured from barrels made for the container industry, traditional steelpans are not of optimum design, said design being characterized by consideration of the required characteristics of the major parts of the steelpan for the creation of an instrument of the highest musical accuracy and rendition. Said major parts are the playing surface, the chime and the skirt.

In the manufacture of the traditional acoustic instrument, little or no attention is paid to the need to modify or adapt the chime and skirt to optimize performance. Moreover, the playing surface is only shaped with the sole intent of defining musical note areas. These said three components can detract from the musical accuracy of the instrument as they resonate at their own natural structural modal frequencies when the instrument is struck during a performance. Said modal frequencies have been measured at as low as 15 Hz. As these natural modes of vibration are associated with modal deformations of the playing surface, the geometry of the notes defined therein is distorted resulting in low frequency modulation of the note frequencies.

In addition to the modulation effect, the non-musical vibrations of the skirt, in particular, contribute to noise that detracts from musical quality. In particular, high frequency resonances can often be discerned when a note is struck and very often even after the musical components of the generated sound have substantially decayed. These resonances are generated primarily from the parts of the playing surface that are not tuned as note areas, from the chime and from the skirt. This is a pertinent issue with the traditional steelpan which requires resolution and has been readily identified by varied experts with keen musical ears.

As well, the frequency response of the closed-open tube that forms the skirt has maxima at odd multiples of the first resonance and minima at even multiples of the first resonance. Moreover, the difference between maxima and minima increases as the ratio of barrel radius and length decreases. Said radius/length ratio typically varies from 0.32:1 for the bass to 1.83:1 for the tenor steelpan. Thus, although a stronger resonance exists for the bass instruments, the frequency response of the closed-open tube of which it is formed is much more uneven than for the higher pitched instruments that use shorter skirts. This can have deleterious effects on tonal structure.

By comparison, the resonance effect that arises from the characteristic uneven frequency response of the closed-open tube design used in wind instruments such as the clarinet or flute is absolutely essential for the generation of notes and their corresponding harmonic overtones. Said instruments have radius/length ratios of the order of 0.04:1.

However, when applied to the traditional steelpan the tube which forms the skirt is not, by virtue of the same characteristic uneven frequency response, an optimum acoustic resonator for the simultaneous spectrum of overtones that typically exists for notes on the playing surface. For example, if the length of the skirt is adjusted so that its first resonance corresponds to the pitch of the lowest note on a given drum, then the octave of said note would be suppressed as a consequence of the frequency response minimum. This problem is compounded when one considers the effect of the fifth, which would normally be the other note on the playing surface of a bass, and its partials.

In consequence therefore, all of the above suggests that traditional steelpan construction techniques do not adequately focus on the acoustic design of the instrument and that more effective skirt designs are required.

Regrettably, traditional acoustic steelpans do not allow for the easy removal and replacement of the skirt to facilitate maintenance, transportation, or change in instrument sound radiation characteristics.

Traditional acoustic steelpans are usually suspended from a specially designed stand by a string, cord, or wire. Apart from the need for improvement in terms of aesthetics, this arrangement facilitates undesirable coupling of vibration energy between the steelpan, the support stand and the floor on which it is placed. This unwanted coupling can further detract from musical quality through the additional noise component added, particularly from the support stand, or other such structure.

In addition, as the string, cord, or wire by which the steelpan is suspended is usually affixed to the rim of the instrument, the top of the support stand to which the string is attached must project above the rim and therefore impedes somewhat the performance of the player. As well, although support stands with mechanisms for height adjustments do exist, said traditional method of suspension does not facilitate easy adjustment of the attitude of the instrument. This works against the ergonomic use of the instrument.

U.S. Pat. No. 4,214,404 to Rex is among numerous innovations which describe percussive devices which produce musical sound using acoustic or mechanical means and is a drum comprised of a multiplicity of resonant chambers within a single enclosure and excited by a drum head that effectively forms a compound membrane, when pinched against the opening of said resonant chambers. The said invention thus disclosed, uses acoustic resonance of tubes, as its sound generation mechanism and is therefore different in design from the steelpans that exist in the prior art, or as described, such as that of the present invention, that use the modal characteristics of shell indentations on a continuous surface to produce sound.

Canadian patent No. 1209831 (expired) to Salvador and Peters, provided a drum which was adapted to mitigate the drawbacks found in the prior art structure. More specifically, the said invention provided a drum having a musical note bearing surface, which included rectangular notes which were tunable, to have the harmonic modes of each individual note dominate the inharmonic modes.

German patent No. DE20013648U to Schulz and Weidensdorfer outlines a steel drum which has an outer ring of eight tone fields (1-8) representing an octave (diatonic) from middle C to upper C. It also has an inner so-called centre area containing five tone fields, viz. containing upper D, E and F (9-11) and two areas covering B flat or A sharp and G flat or F sharp. Thus the musical range is a tenth form middle C to E above upper C plus two accidentals i.e. B flat or A sharp and G flat or F sharp.

U.S. Pat. No. 5,814,747 to Ramsell the "Percussion Instrument capable of producing Musical Tone" is a device that is comprised of a multiplicity of synthetic tubes of varying lengths, that resonate at different frequencies when struck with a mallet. The invention thus disclosed is a percussive device that produces musical tones, but uses acoustic resonance of tubes as its sound generation mechanism and is therefore different in design from the steelpans which comprise the prior art, or as described such as that of the present invention, which use the modal characteristics of shell indentations on a continuous surface to produce sound.

U.S. Pat. No. 5,973,247 to Matthews, describes The "Portable Steel Drums and Carrier" a device that is comprised of two steelpan drums with eighteen notes on a harness and mount, designed for the carrying of two steelpan drums mounted upon the human body. The invention thus disclosed does not cover the entire musical range, nor does it extend the range of the traditional steelpan, nor does it give consideration to the optimum design of the playing surface, rim and skirt of the steelpan drums used, nor does it consider the design of the skirt to effect sound propagation.

U.S. Pat. No. 6,750,386 to King, describes The "Cycle of Fifths Steelpan," a steelpan which uses a note layout based on the cycle of fourths and fifths. The invention thus disclosed, differs from the prior art only by way of the layout of notes, such that they progress in musical fifths intervals in a counter-clockwise direction, whereas the traditional tenor steelpan as well as the invention described in this document places notes progressing in musical fifths intervals in a counter-clockwise direction. The invention thus disclosed does not cover the entire musical range, nor does it extend the range of the traditional steelpan, nor does it give consideration to the optimum design of the playing surface, rim and skirt of the steelpan drums used, nor does it consider the design of the skirt to effect sound propagation.

U.S. Pat. No. 6,212,772 to Whitmyre and Price, the "Production of a Caribbean Steelpan" describes a manufacturing process to facilitate mass production of the steelpan musical instrument by hydroforming the playing surface. The process also allows for providing the instrument with a means to easily detach the skirt to facilitate maintenance, portability and changes in tonal characteristics. However, the description in said aforementioned patent, does not disclose an instrument that extends the range of the traditional steelpan, nor does it reduce the number of steelpans required in an orchestra, nor does it give consideration to the optimum design of the playing surface, rim and skirt of the steelpan drums used for the reduction of non-musical resonances, nor does it consider the design of the skirt to effect sound propagation, nor does it treat with the issue of how the steelpans are to be suspended.

In particular, whereas previously, steelpan quality was subject to the inconsistencies of drums and barrels that could be accessed by tuners, but which were fabricated for the express purpose of packaging, the ensemble of the present invention features a playing surface that is significantly improved through use of certified high quality steels, specifically selected for its manufacture.

In addition, the playing surface is of a compound design to support the creation of notes in the upper musical ranges. The present invention noticeably breaks with the traditional consideration of a drum as an integral entity, treating with said drum, instead, as an item that is constructed from three separate components after deliberate and careful design of said components of the instrument, for optimization of function and in so doing, overcomes the heretofore mentioned disadvantages of the prior art.

SUMMARY OF THE INVENTION

In one aspect the present invention provides an ensemble of steelpan instruments which adequately extend the upper and lower musical ranges of the steelpan assemblage. Moreover, the range of each instrument of the ensemble of the present invention, effectively covers a large number of notes. As a result, only four instruments are now required to cover the entire music spectrum whereas, for the traditional acoustic instrument, as many as eleven instruments or more are required.

In another aspect, there is a consequent extension of the musical range of the entire ensemble of instruments beyond the upper and lower musical ranges of the existing steelpan assemblage of the prior art. To facilitate the wide range of notes of the present invention, drums are designed with a 67.31 cm/26.50 in. diameter, the approximate maximum size for a single drum based on ergonomic considerations and utility in performance.

In one embodiment, the playing surface is supported by a rigid chime that reduces coupling across the playing surface and between playing surface and skirt, a vibration mechanism that often detracts from musical quality in the prior art. The rigid chime also reduces the need for retuning due to temperature variations that tended to undo the mechanical crimp chime design used in the prior art.

Utility may be further enhanced by consideration of portability and assembly for performance. In particular, whereas the traditional instrument is suspended by a string, cord, twine or similar contrivance to a support stand, the present invention offers a built in suspension mechanism in the form of a wheel that is inserted into a receptacle mounted upon the arms of the support stand thus facilitating the process of rapid one-step assembly of the present invention for a performance. One only has to insert the wheels into the receptacle for the present invention to be performance ready. Said wheel and receptacle arrangement is unique to instruments of any nature and facilitates the free swinging motion traditionally required by performers.

In another aspect, a steelpan drum ensemble is designed using two complementary physical note layout philosophies. This reduces the number of layout styles with which a player must become familiar on different steelpan instruments. The note layout philosophy is motivated by the musical cycle of fourths and fifths on a single drum, as obtains for the traditional tenor steelpan, or the two whole note scales as exists on the traditional double second steelpan which utilizes two drums. These layout styles complement each other as the fourths and fifths produces the least dissonant coupling between adjacent notes when applied in a uniform fashion to steelpans with one, three, or six drums, whereas the whole tone scale layout, produces the least dissonant coupling between adjacent notes, when applied in a uniform fashion to a steelpan assemblage comprising of two or four drums.

Note layout patterns can be replicated and extended to steelpans with a higher multiplicity of drums in such a manner as to preserve, as far as is possible, the relative position of notes. In both layout styles, notes are laid out in circles which are repeated to create a "spider web" effect, whereby the cycle of notes are arranged in concentric rings with note pitches increasing by an octave per ring as one moves towards the centre of the playing surface.

The design philosophy of the present invention, differs from the prior art in that the latter is made from pre-manufactured barrels that are often designed, through material selection and construction, for the sole purpose of packaging. As such the materials used are often not the best suited for the steelpan and are often of unknown and variable quality and metallurgical composition.

The ensemble of acoustic steelpan drums of the present invention, on the other hand, are of a compound design and construction, being fabricated from parts consisting of a playing surface bonded by a rigid chime that is itself fastened to a rear attachment. The playing surface is itself of compound design to better facilitate the wide range of notes on each such steelpan drum. In particular, the playing surface incorporates an insert that is specially machined and formed to support notes in the highest ranges of any given instrument of the ensemble of the present invention. One set of embodiments features an option of three types of rear attachments, several resonators and acoustic radiators to enhance the musical performance by increasing the acoustic radiation levels from each instrument.

At the same time, the rear attachments of the present invention can use damping methods known to those skilled in the art, to reduce or minimize undesirable rear attachment resonances while significantly reducing the level of non-musical resonances that are typical in the prior art. Said resonances often arise from the skirt of the traditional instrument which is neither treated nor modified in any way in the prior art to subdue such resonances. Thus it may be said that the rear attachment design of the present invention, therefore significantly improves on the prior art whereby players are constrained to rear attachments that are a single barrel, or tube.

In another aspect, a method of configuring an orchestra is provided, the method comprising combining a plurality of acoustic steelpan musical instruments of compound design as described herein.

| | |
|---|---|
| 1 | Playing Surface |
| 1a | Notes |
| 1b | Support Web |
| 1c | Note Covers |
| 1d | Main Bowl |
| 1e | Main Bowl Flange |
| 1f | Vibration Absorption Gasket |
| 1g | Secondary Bowl |
| 1h | Secondary Bowl Gasket |
| 1i | Ring 0 |
| 1j | Ring 1 |
| 1k | Ring 2 |
| 2 | First Drum on G-Second Steelpan |
| 3 | Second Drum on G-Second Steelpan |
| 4 | First Drum on G-3Mid Steelpan |
| 5 | Second Drum on G-3Mid Steelpan |
| 6 | Third Drum on G-3Mid Steelpan |
| 7 | First Drum on G-6Bass |
| 8 | Second Drum on G-6Bass |
| 9 | Third Drum on G-6Bass |
| 10 | Fourth Drum on G-6Bass |

-continued

| | |
|---|---|
| 11 | Fifth Drum on G-6Bass |
| 12 | Sixth Drum on G-6Bass |
| 13 | Chime |
| 13a | Support Ring |
| 13b | Abutment |
| 13c | Suspension Wheel |
| 13d | Suspension Wheel Axle |
| 14 | Rear Attachment |
| 14a | Attitude Offset Weights |
| 15 | Support Stand |
| 15a | Support Stand Uprights |
| 16 | Support Cups |
| 17 | Tube |
| 18 | Outer Shell |
| 19 | Frame |
| 19a | Concentric Braces |
| 19b | Radial Braces |
| 20 | Resonant Sections |
| 21 | Type 3 Rear Attachment |
| 22 | Port opening |

DETAILED DESCRIPTION

Terminology

Percussion: the playing of music by striking an instrument.

Player: someone who plays a musical instrument

Steelpan: a definite pitch percussion instrument in the idiophone class, traditionally made from a cylindrical steel drum or steel container although they may now be made from other materials. The playing surface is typically divided into sections by channels, grooves or bores. Each section includes a note tuned to a definite pitch. The cylindrical portion of the drum from which the traditional steelpan is made is usually retained to act as resonator and to provide physical support for the playing surface.

Pannist: a person skilled in the art of playing a steelpan.

Fourth Musical Interval (Fourths): Two notes vary by a fourth or are separated by a fourth musical interval if the ratio of their pitch frequencies is nominally $2^{5/12}$ on the scale of equal temperament.

Fifth Musical Interval (Fifths): Two notes vary by a fifth or are separated by a fifth musical interval if the ratio of their pitch frequencies is nominally $2^{7/12}$ on the scale of equal temperament.

Fourths And Fifths Arrangement: An arrangement of musical notes in which the sequence of adjacent notes differ by a musical fourth interval in one direction and, therefore, a musical fifth interval in the opposite direction.

In one aspect, the "G-Pan ensemble" spans the musical range $G_1$ to $B_6$. This improves on known ensembles by eight (8) semitones as traditional acoustic steelpans span the musical range $A_1$ to $F_6$. In addition, the G-Pan ensemble can consist of only four distinct instruments, the G-6Bass, G-3Mids, G-Second and G-Soprano, to cover this range whereas traditional steelpans utilize as many as eleven (11) or more distinct instruments.

Figure 13:
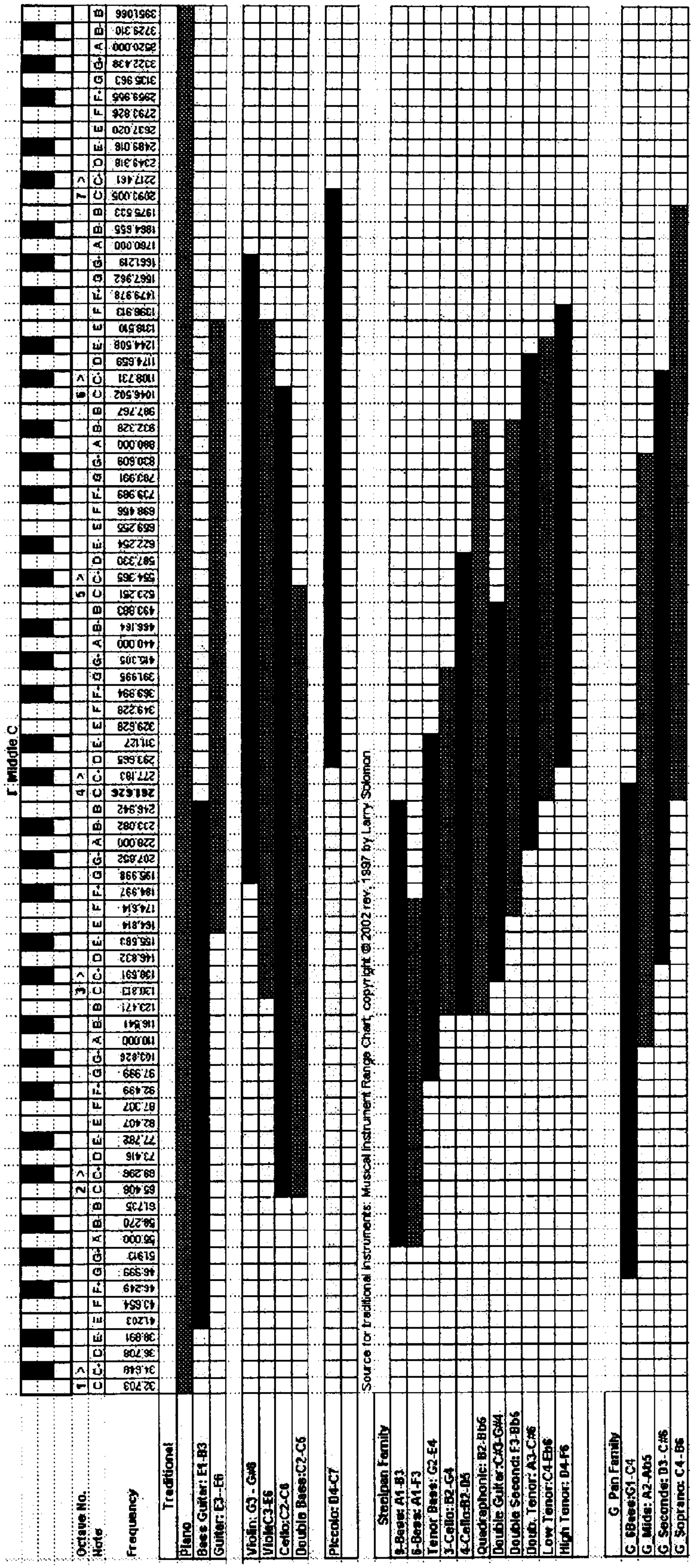
FIG. 13 is a table illustrating the musical ranges for various existing musical instruments and for a steelpan ensemble configured in accordance with an embodiment of the present invention.

FIG. 13 (Table 1) shows a comparison of the G-Pan ensemble range with the typical musical ranges of traditional steelpans. It is immediately obvious that the new O-Pan design removes the clutter that results from having such a large number of instruments to cover a smaller musical range by reducing the number of steelpan sets to four. The G-Pan ensemble is therefore now more in line with more traditional instruments as is shown for the case of string instruments in FIG. 13 (Table 1), for example. It will be noted that a string orchestra can effectively cover a wide musical range with just four instruments.

In one embodiment, the G-6Bass can cover the musical range $G_1$ to $C_4$, a total of 30 notes or 2½ octaves, on 6 drums. The G-6Bass therefore can exceed the combined ranges of the traditional nine-bass and six-bass steelpans.

In another embodiment, G-3Mids cover the musical range $A_2$ to $A^{\flat}_5$, a total of 36 notes or 3 octaves, on 3 drums. The G3-Mid therefore covers the baritone to alto range and exceeds the combined ranges of the 3-cello, 4-cello and double guitar steelpans as well as a significant amount of the quadraphonic steelpan and tenor bass steelpan ranges.

Although the preferred embodiment of the G-3Mid steelpan of the present invention incorporates three octaves of notes to ensure maximum clarity and musical activity through judicious spacing between notes, the G-3Mid steelpan can accommodate as many as 45 notes on its playing surface thus exceeding the typical musical range of the quadraphonic steelpan.

G-Seconds cover the musical range $D_3$ to $C^{\sharp}_6$, a total of 36 notes on 2 drums. It targets the alto and tenor ranges and exceeds the combined ranges of the traditional double second and double tenor steelpans. The role of the G-Second steelpan of the present invention, is to provide support to the G-Soprano steelpan which will be the front line instrument in most performances.

G-Sopranos cover the musical range $C_4$ to $B_6$, a total of 36 notes or 3 octaves, on a single drum. It targets the soprano range and exceeds the combined musical range of the Low Tenor steelpan and High Tenor steelpan.

The note ranges shown for the G-pan ensemble in FIG. 13 (Table 1) are nominal values as the design allows for variation in the lowest notes by plus or minus 2 semitones.

The G-Pan ensemble of steelpans of the present invention provides a wider range of notes on each instrument through the use of larger drums. Whereas the traditional instrument typically has a diameter of 55.88 cm/22 in as measured across the top of the bowl, the diameter of the playing surface of the said G-pan is 67.31 cm/26.50 in. The increased diameter provides more flexibility in obtaining greater bowl depth and, consequently, surface area on the playing surface hence accommodating a larger number of notes.

For the traditional acoustic tenor pan, tuners would typically create a bowl depth of 20.32 cm/8 in. Assuming a spheroid bowl and using the corresponding formula:

$$S_a=\pi(r^2+d^2)$$

where $S_a$ is the spheroid bowl surface area, r the radius of the top of the bowl, and d the depth of the bowl the bowl surface area for the traditional tenor steelpan, prior to note demarcation, would be 3749.2 $cm^2$/581.2 $in^2$. For the G-Soprano, a depth of 25.4 cm/10 in can easily be achieved resulting in a surface area of 5517.7 $cm^2$/855.2 $in^2$ or an increase in surface area of roughly 47%. This allows more flexibility over the traditional instrument in the number and range of notes that can be accommodated.

The sheet metal blank from which the bowl is formed has a thickness in the range 1.2 mm to 1.5 mm and has carbon content rating of 0.04% to 0.06%. The actual thickness of the sheet metal blank used depends on the tonal range and timbre required. In the preferred embodiment of the ensemble of the present invention, the G-Soprano and G-Second steelpans are made from 1.2 mm blanks, the G-3Mid steelpan from 1.4 mm blanks and the G-6Bass steelpan from 1.5 mm blanks Thinner blanks facilitate the creation of notes in the higher register and are therefore preferred for the G-Soprano and G-Second steelpans. However, the use of thicker blanks facilitates the suppression high pitched overtones due to the higher mass per unit area. The latter also tends to minimize note frequency modulation incurred by structural flexure of the entire drum.

Each G-pan steelpan instrument of the present invention has its unique harmonic characteristic thus resulting in variation of voicing in the common musical ranges. Said variation in voicing is a consequence of note geometry, placement and tuning. Further variations in voicing are possible through the choice of the mallet or stick used to play the instrument and by more selective shaping, relative positioning, separation and tuning of notes.

In comparison to the prior art, the G-Pan ensemble of the present invention utilizes only two given note layout designs. Both said layout designs seek to ensure that, as far as is possible, adjacent notes differ by the same consonant interval, while facilitating easy hand movements to play any of the more common scales, through a logical and consistent distribution of notes.

The first given preferred layout design of the present invention, preserves the relative note placement of the circle of fourths and fifths on all of the said steelpans of the ensemble, when the notes are to be distributed over one, three, or six drums. The sequence of an octave of notes in the fourths and fifths layout is, increasing in fifths from C, C, G, D, A, E, B, $F^{\sharp}$, $C^{\sharp}$, $A_b$, $E_b$, $B_b$, F.

The second given preferred layout design complements the aforementioned first design, in that it is applied to steelpans where the notes are distributed over two or four drums and is based on the two whole tone scales that complement each other in any given contiguous octave of notes. Starting from C, the first whole tone scale is C, D, E, $F^{\sharp}$, $A_b$, $B_b$ while the second is $C^{\sharp}$, $E_b$, F, G, A, B.

Figure 1:
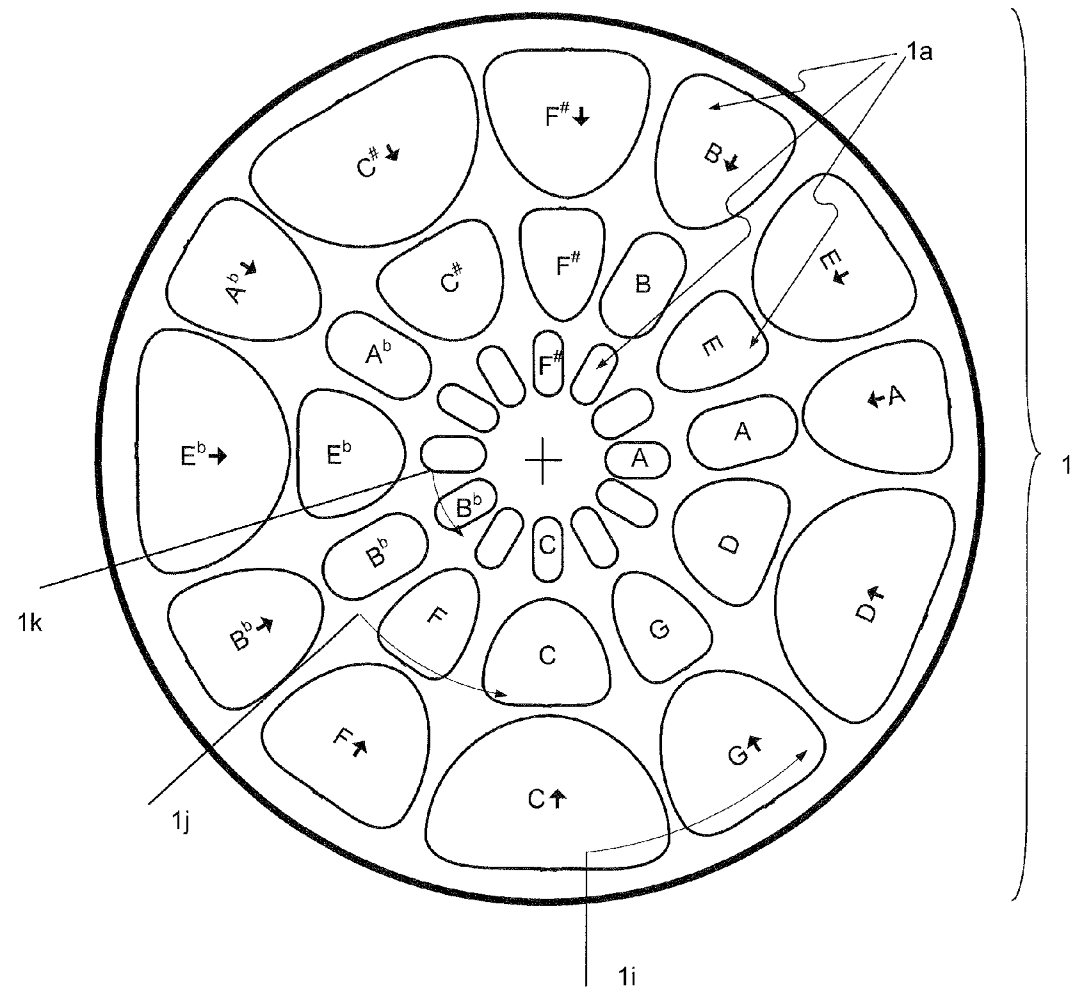
FIG. 1 shows the note layout for a preferred embodiment of the G-Soprano steelpan of the ensemble of the present invention.
Figure 2:
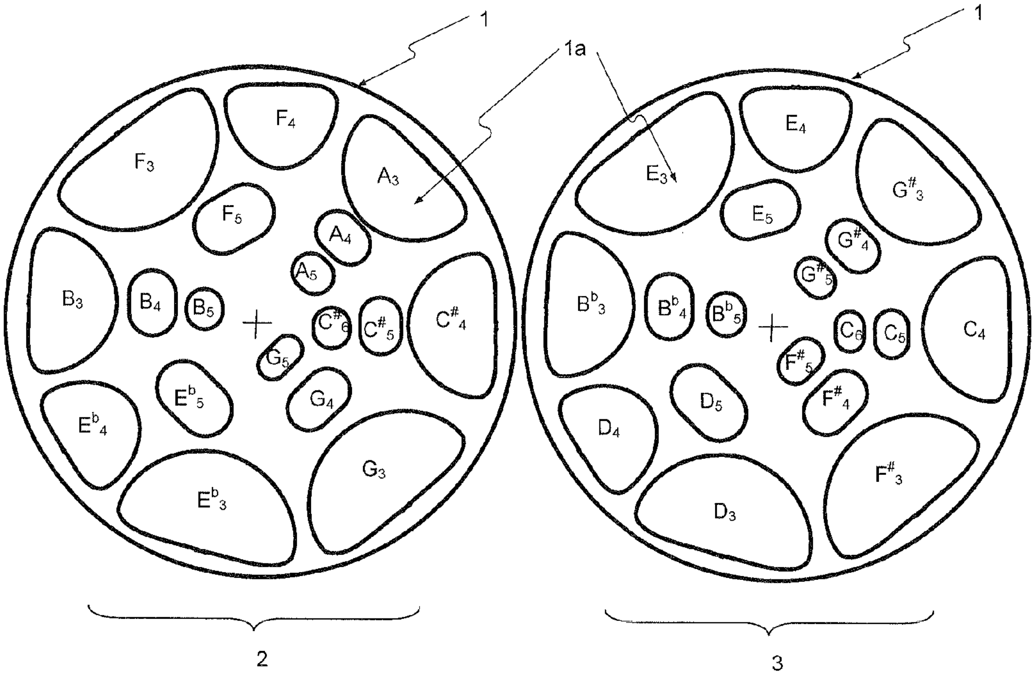
FIG. 2 shows the note layout for a preferred embodiment of the G-Second steelpan of the ensemble of the present invention.
Figure 3:
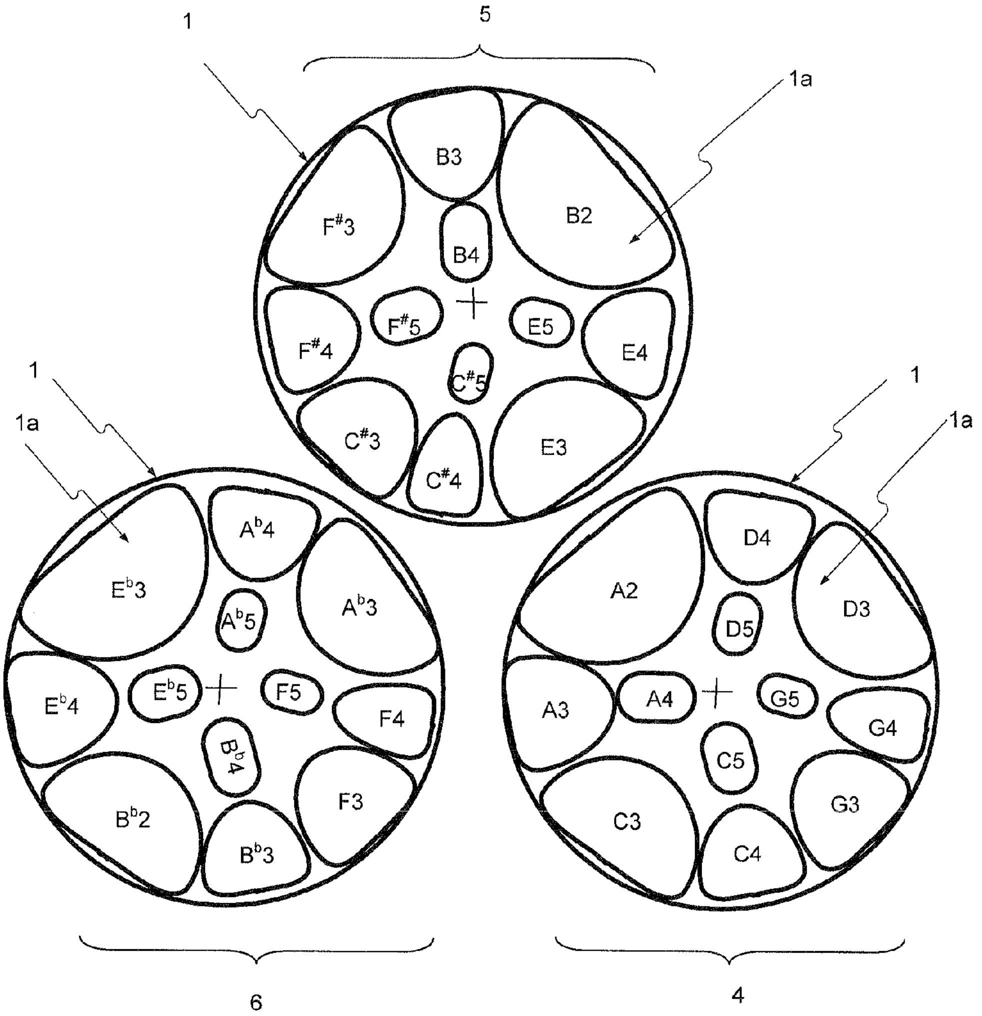
FIG. 3 shows the note layout for a preferred embodiment of the G-3Mid steelpan of the ensemble of the present invention.
Figure 4:
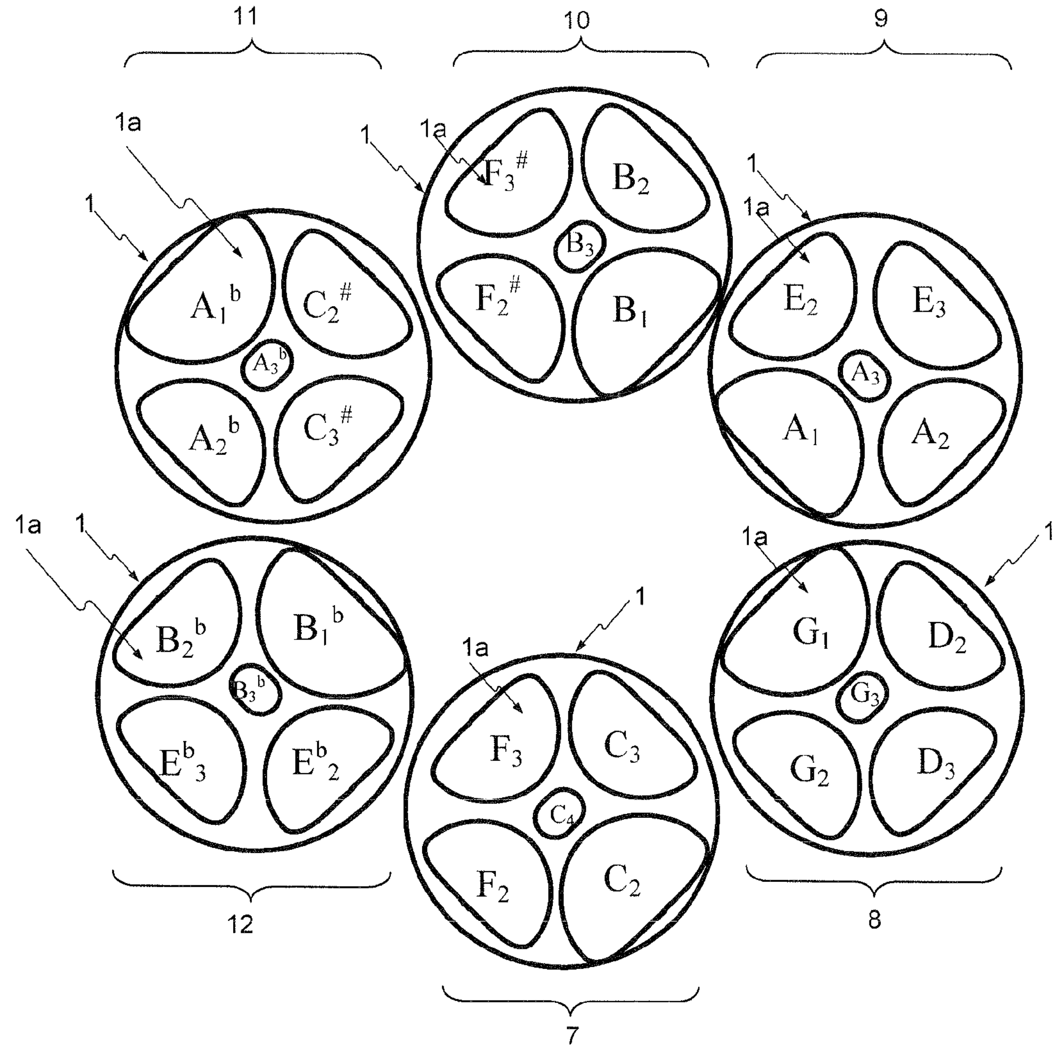
FIG. 4 shows the note layout for a preferred embodiment of the G-6Bass steelpan of the present invention.

The given preferred note layout for the G-Soprano steelpan of the present invention is shown in FIG. 1 of the drawings, while the preferred note layout for the G-Second steelpan of the present invention is shown in FIG. 2. The preferred note layout for the G-3Mid steelpan of the present invention is shown in FIG. 3 of the drawings, followed by the preferred note layout for the G-6Bass steelpan of the present invention as shown in FIG. 4.

The G-Soprano layout of the present invention is an extension of the prior art, as it applies to the tenor steelpan and as shown in FIG. 1, is obtained by repeating the complete circle of fourths and fifths in three concentric rings of 12 notes each, comprised of an outer ring, Ring 0 1*i*, a middle ring, Ring 1 1*j*, and an innermost ring, Ring 2 1*k*. As is the case of the traditional tenor pan, the C note is placed at the bottom of the circle, corresponding to the part of the drum that is closest to the player, so as orientate the layout. This orientation is maintained even if the G-Soprano range begins at a lower pitch. Tests have shown that the G-Soprano as implemented on the 67.31 cm/26.50 inch drum can accommodate a 3-octave range starting from $A_3$.

Although the G-Soprano steelpan in FIG. 1 shows the notes progressing in fifths in an anticlockwise direction, the pan can be implemented by reversible rendering of this layout as well.

The preferred embodiment of the G-Soprano steelpan implements the fourths and fifths layout, with fifths progressing in the anticlockwise direction. The layout of notes on each drum of the G-Soprano is therefore such that physically adjacent note pairs are separated by a musical interval of fourths or fifths. Musical dissonance is therefore reduced as these intervals are recognized as consonant.

Reference is now made to FIG. 2. The G-Second steelpan's note layout is based on a division of the C-major scale into whole tones, i.e. intervals of two semitones. The notes are chosen by first selecting a root note on the circle of fourths and fifths and selecting every other note on the circle while circumventing the circle in the direction of fifths. This will give the six lowest notes on the right drum 2 of the G-Second steelpan. The remaining six notes on the scale are then allocated to the remaining drum 3. On each drum, octaves of the lowest notes are created and the process repeated until the double octave is achieved. Due to space limitations, the first octave of each of the two lowest notes is placed on the outer circle of notes alongside said notes. This is seen for the D, $E^{\flat}$, E and F notes on the preferred embodiment in FIG. 2. For all other notes the octave and double octaves are placed in the preferred manner, i.e., on two separate concentric circles of notes on the inner portion of the drum.

For all but the G-Second steelpan of the ensemble of the present invention, the preferred G-pan note layout is derived by uniform division of the circle of fourths and fifths into groups of consecutive notes on said cycle. In the case of the G-Second, any attempt at such a division will result in two notes on each drum of the G-Second being one semitone, or a minor second apart resulting in a strong likelihood of dissonance of the worst kind.

The allocation of notes based on whole tones helps to overcome this problem. In addition, the note allocation is such that adjacent notes are a major or minor third apart except for one pair of notes on each drum, that is an augmented fourth apart, corresponding to what is considered to be the most favorable of the intervals considered to be dissonant. Coupling between these two notes, $B_3$ and $E^{\flat}_4$ on the left drum and $B^{\flat}_3$ and $E_3$ on the right drum, can be reduced by application of methods described below.

The two-drum complement of the ensemble of the present invention that makes up the G-Second is designed to support the G-Soprano which will be the front line instrument in most performances. In this respect it has an advantage over the three-drum G-3Mid, as the lower number of component drums more readily facilitates the performance of fast musical passages.

Reference is now made to FIG. 3 which shows the preferred layout configuration for the G-3Mid steelpan of the present invention. The G-3Mid represents a major departure from the prior art as it distributes the cycle of fourths and fifths over three drums, an approach that has, hitherto, never been applied.

The G-3Mid layout is derived by assigning three octaves of four consecutive notes in the circle of fourths and fifths to each of the three drums in the G-Mid set. This places 12 notes on each drum of the G-3Mid. The four notes assigned to the first drum 4 are obtained by selecting a root note and the next three notes progressing in fifths. The next four notes in the cycle of fourths and fifths progressing in fifths are then assigned to the second drum 5. The final four notes in the cycle of fourths and fifths progressing in fifths are then assigned to the third drum 6. As there are 12 notes in an octave, there are consequently 12 unique ways of allocating notes to the 3 drums using this procedure. The choice of the root note depends on a variety of factors, most significantly musical range, drum size, the size of note templates used by the tuner and preservation of the G-Soprano note layout alignment.

In the case of the G-3Mid with note layout as shown in FIG. 3, for example, if the root note is C three octaves each of C, G, D and A would be allocated to the first drum 4. The next 4 notes on the cycle, progressing in fifths, i.e. three octaves of E, B, $F^{\sharp}$ and $C^{\sharp}$ would then be placed on the second drum 5. Finally the last 4 notes on the cycle, progressing in fifths, i.e. three octaves of $A^{\flat}$, $E^{\flat}$, $B^{\flat}$, and F would be placed on the third drum 6.

The layout of notes on each drum of the G-3Mid is such that physically adjacent note pairs are separated by a musical interval of fourths, fifths or sixths. Musical dissonance is therefore reduced as these intervals are recognized as consonant.

Reference is now made to FIG. 4 which illustrates the preferred layout configuration for the G-6Bass steelpan. The G-6Bass layout is an extension of what obtains for the 6-Bass in the prior art and is obtained by assigning the full three octaves of a note and two octaves of its fifth to each of the six drums 7, 8, 9, 10, 11, 12 that comprise the G-6Bass. This places 5 notes on each drum of the G-6Bass. The two notes assigned to the first drum 7 are obtained by selecting a root note and its fifth.

The next two notes in the cycle of fourths and fifths progressing in fifths are then assigned to the second drum 8. This process is continued until the last two notes on the cycle of fourths and fifths are assigned to the sixth drum 12. As there are 12 notes in an octave, there are therefore 12 unique ways of allocating notes to the 3 drums using this procedure. The choice of the root note depends on a variety of factors, most significantly musical range, drum size, the size of note templates used by the tuner and preservation of the G-Soprano note layout alignment.

In the preferred embodiment the G-6Bass covers 2½ octaves an increase of an entire octave over what obtains in the traditional six-bass. Moreover, the G-6Bass exceeds the combined ranges of the nine-bass and six-bass steelpans and substantially covers the tenor bass steelpan range. With the procedure described, the lowest six notes in the G-6Bass range are implemented in three full octaves; these therefore also establish the highest six notes in the range of the instrument. The remaining notes on the G-6Bass complement the octave range of the first six and are implemented in two octaves.

The layout of notes on each drum of the G-6Bass is such that physically adjacent note pairs are separated by a musical interval of fourths, fifths. Musical dissonance is therefore reduced to the minimum possible consonant intervals. This is significant for the bass range where the critical band of frequencies associated with the perception of dissonant tones is smaller in the bass range than for other musical ranges. The need to allocate notes to multiple drums is determined by the physics of the instrument design which dictates that notes on the lower register must be larger in size than notes in the higher register. It is believed that the frequency is inversely proportional to the longest dimension of the note area to the power 3/2. As technology develops and allows for a reduction in note size, it will become possible for the lower registers to be placed on a single drum.

Figures 5A, 5B, 5C, 5D, 5E:
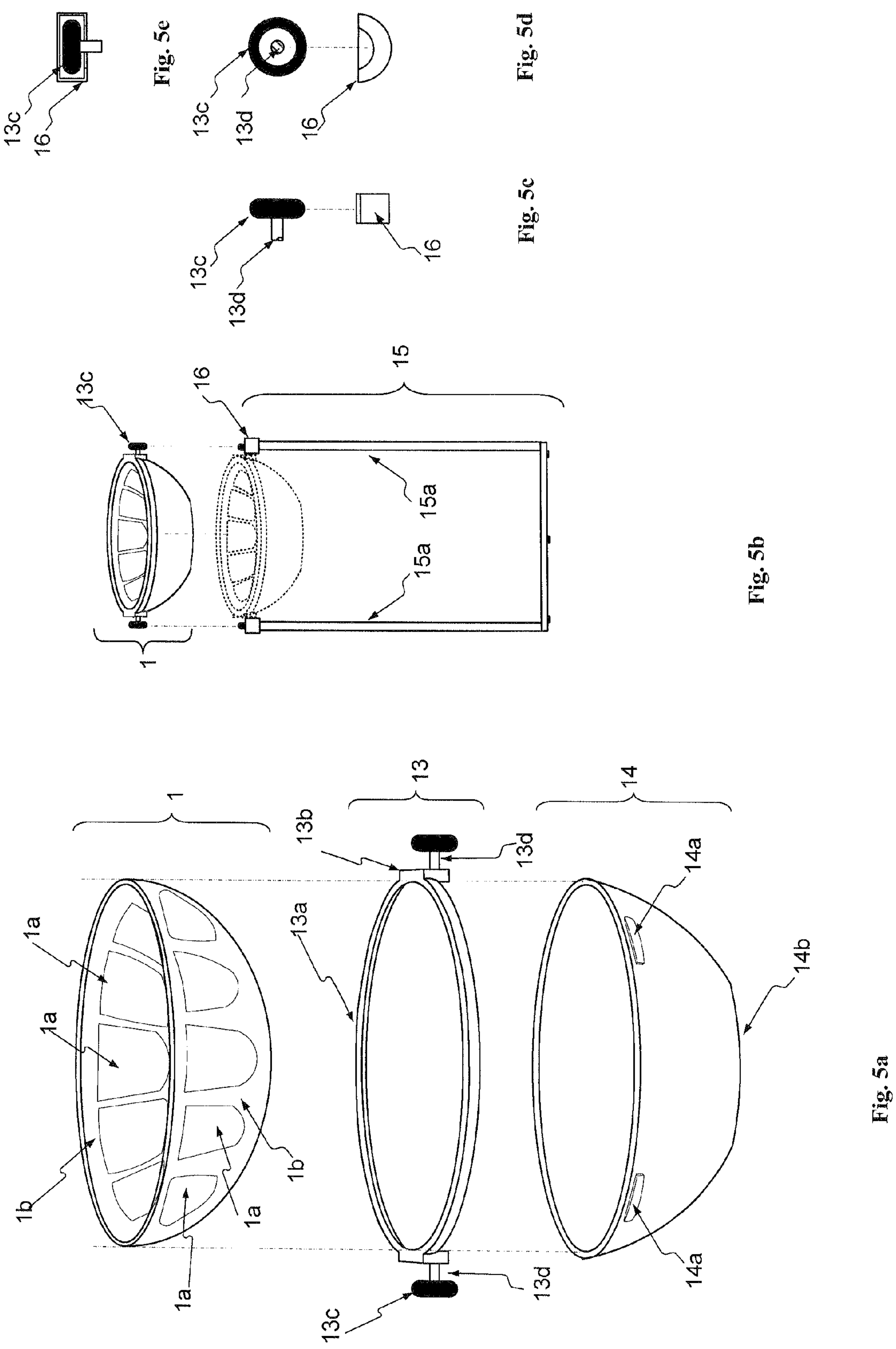
FIG. 5 shows an exploded view of a preferred embodiment of a single acoustic steelpan drum of the ensemble of the present invention and includes an illustration of how the said drum is to be mounted utilizing the wheel and receptacle attachments.

FIG. 5 shows construction and application aspects of a typical drum in the G-Pan family. FIG. 5*a* provides an exploded view of said typical drum showing the component parts. FIG. 5*b* provides an illustration of how said drum can be supported in the case of the G-Soprano, G-Seconds and G-3Mid instruments. FIG. 5*c*, FIG. 5*d* and FIG. 5*e* show detail perspectives of the support wheel and support cup used in the preferred method for attaching the steelpan to a support stand.

Reference is drawn to FIG. 5*a*. The drum consists of a playing surface 1 upon which are placed the notes 1*a* that are the tuned sections of said playing surface 1*a* chime 13 that provides support and a rigid boundary for the playing surface and a rear attachment 14 that replaces the skirt in the traditional steelpan. The rear attachment 14 shown in FIG. 5*a* is but one of several optional designs.

Said notes on the playing surface 1 produce musical sound when struck with an appropriate implement such as a stick or mallet specially made for this purpose. The playing surface is made from sheet metal that is formed to create the bowl shape shown in FIG. 1. One embodiment utilizes steel sheet metal with carbon content rating of 0.03% to 0.07% and preferably from 0.04% to 0.06%.

The region of the playing surface 1 that exists between the notes and is therefore that part of the playing surface 1 that is not tuned is defined in this document as the support web 1*b*. The support web 1*b* bears no distinct musical pitch when struck but serves to physically separate and support the notes 1*a* on the playing surface 1 while connecting the entire structure to the chime 13.

The sinking method used to shape the playing surface 1 should result in an ultimate thickness profile that ensures that the thinnest cross-section is at the centre of the playing surface 1 where notes with the highest pitch are to be located.

The bowl shape of the playing surface 1 facilitates the formation of a rigid shell upon which the playing surface 1 is established; the rigidity of the shell is further enhanced by the natural hardening that takes place as the sheet metal is worked into the ultimate shape.

The bowl shape of the playing surface 1 also facilitates the establishment of an ergonomic form for said playing surface 1, allowing the average pannist, with an arm reach of some 76.2 cm/30 in, to access all notes within the natural extension capabilities of their arms and wrists.

The shaping process applied to the fabrication of the playing surface 1 preferably should not allow for the achievement of the maximum strain, inter-granular separation or excessive work hardening in the material. Intermediate heat treatment to stress relieve the material may be necessary as shaping takes place depending on the depth and thickness required in the finished form.

Milling or grinding can be used to attain the required shape profile and thickness, particularly in the inner section of the playing surface 1 where notes in the higher register are to be placed. This is particularly crucial for notes in the sixth octave on the G-Soprano pan as traditional sinking methods result in a thickness at the bowl center of half the original metal sheet blank thickness or 0.60 mm/0.024 in whereas for the G-Soprano pan it has been determined that a uniform thickness of 0.30 mm to 0.45 mm is required to obtain notes of high clarity with limited modulation of tone and good musical quality.

In order to minimize coupling and reduction in the tension afforded by the material interconnecting said notes, grinding and milling is restricted to the note areas themselves. Additionally, the hardness of the thinned sections is increased by chemical or heat treatment to improve their robustness and to increase the modal frequencies that can be attained by traditional tuning.

Again in reference to FIG. 5*a*, the chime 13 functions to:

(a) minimize static shape distortion due to external forces and temperature variations and, most significantly, transient shape distortion generated by the torsion modes that are excited by the impact of the playing stick and contribute significantly to note modulation, and, in addition, (b) provide a support structure for connection of the rear attachment 3.

Said chime 13 is comprised of a support ring 13*a* of solid or hollow round, square, rectangular or ellipsoidal cross-section and a pair of abutments 13*b* that provide structural extension of the support ring 13*a* to facilitate attachment of suspension wheels 13*c*. The chime should be made of the same steel composition as the playing surface so as to eliminate the risk of corrosion due to galvanic action. However, other materials, such as aluminum, can be used so long as the result is a rigid frame that significantly reduces the level of torsional vibration that occurs in the traditional instrument as the instrument is played and adequate anti-corrosive preventative measures, known to those skilled in the art, are utilized.

The chime 13 may be attached to the playing surface by any appropriate method, such as welding, crimping, seaming, gluing, the use of mechanical fasteners or any combination of the foregoing and any method that prevents relative movement and vibration of the ring and the playing surface.

In the preferred embodiment of the present invention the chime 13 is fabricated from 2.54 cm/1.00 in wide milled steel of 0.64 cm/0.25 in thickness formed into a circle of radius 66.68 cm/26.25 in. Abutments 13*b* are added along at the intersection of the perimeter support ring 13*a* and the diametric line of the support ring 13*a* that defines the points at which the drum is to be suspended. Suspension wheels 13*c* are affixed to the abutments with axles 13*d* that allow free rotation of said suspension wheels 13*c*. Suspension wheel 13*c* diameter is between 5.04 cm/2.00 in to 7.62 cm/3 in.

The abutment 13*b* and suspension wheel 13*c* are so positioned that the top of the suspension wheel 13*c* is at, or beneath the top of the chime 13. The latter requirement eliminates any possible obstruction from the support stand 15 on which the steelpan drum is to be placed when notes in the vicinity of the abutment are played, an improvement on what currently obtains in the prior art whereby the upright 15*a* of the stand protrudes above the top of the chime 13.

The chime 13 is so designed and fitted to allow for its connection to a rear attachment 14 that serves the dual purpose of (a) protecting the bowl of the pan from physical shock and (b) providing a means of enhancing the acoustic radiation of the sound emanating from the playing surface 1 either directly by way of vibration of the rear attachment 14 itself or by way of its acoustic design.

The rear attachment 14 must be rigid enough to reduce or eliminate any sympathetic vibrations that would contribute negatively to the sound of the instrument. Such vibrations would typically occur at non-musical frequencies corresponding to resonance modes of the rear attachment 14. This is one problem which plagues the traditional acoustic steelpan instrument, whereby the energy imparted by the striking action of the player, excites non musical modes on the skirt of the instrument.

Virtually any rear attachment 14 of rigid design that adequately covers a significant part of the playing surface 1 will serve the purpose of protecting said playing surface 1 of the pan from physical shock. In particular, the traditional cylindrical tube design suffices in regard to protect the playing surface 1. However, the preferred embodiment of the present invention incorporates a rear attachment 14 as shown in FIG. 5*a* is a partial sphere, or bowl shaped, with a hole or port 14*b*, cut into the bottom of the bowl thus forming a ported acoustic enclosure, the details of which are described later in the document.

The curved surface of the rear attachment 14 of the preferred embodiment of the present invention is an improvement over the prior art, as it is inherently stronger than the cylindrical tube design used on the traditional steelpan. The improved strength of dome or bowl structures over cylindrical or tube structures, is well known to those who are versed in the area of structural vibration control. The higher strength of the rear attachment used on the preferred embodiment of the present invention therefore results in increased resistance to deformation from external forces and produces resonances with lower vibration intensity levels for the same impact.

In the preferred embodiment of the present invention, the resistance of the rear attachment to vibration is further enhanced through a variety of physical means known to those skilled in the art of vibration control. These include fabrication from vibration resistant materials such as wood, fiberglass, composites or synthetics or metal of appropriate thickness and other material appropriately reinforced to reduce or eliminate the natural vibration modes associated with such a structure. In addition, the rear attachment 14 may be covered with vibration absorbing panels, sheets or compound such as those commercially available from Dynamat.

The rear attachment 14 can be affixed to the chime 13 by welding, crimping, seaming, gluing, the use of mechanical fasteners or any combination of the foregoing and any method that prevents relative movement and vibration of the ring and the playing surface. The preferred embodiment of the present invention incorporates the use of mechanical fasteners onto a solid chime 13 to facilitate G-Pans with removable and interchangeable rear attachments 14.

Attention is now drawn to FIG. 5*b*, FIG. 5*c*, FIG. 5*d* and FIG. 5*e* that illustrate a preferred method for suspension of G-Pans that facilitates the free swinging motion as obtains in the prior art. G-Pans provide this feature through the use of suspension wheels 13*c* as described and support cups 16 that are affixed to the top of the uprights 15*a* of the support stand 15. FIG. 5*c* shows an exploded view of the front of the suspension wheel 13*c* and support cup 16 as seen from the perspective shown in FIG. 5*b*. FIG. 5*d* shows an exploded view of the side of the assembly as seen from the perspective closest to the steelpan with a section through the axle 13*d* of the suspension wheel 13*c*. FIG. 5*e* shows a plan view of the assembly.

The support cups 16 are of a simple semicircular design that facilitates a snug fit to the shape of the suspension wheel 13*c*. The functionality of the arrangement can be further enhanced by lining the support cup 16 and using suspension wheels 13*c* with vibration absorbing material such as foam. This would attenuate the vibration energy transmitted between the steelpan and support stand 15 thus reducing sympathetic vibration of the stand, a potential source of noise in the traditional steelpan.

In operation, the support cups 16 hold the suspension wheels 13*c* in place facilitating a full 360° of movement of the G-pan drum about the axis of rotation established by the line joining the axles 13*d* of the suspension wheels 13*c*. This design also facilitates rapid one-step set up of G-Pans as one only has to place the suspension wheels 13*c* in the support cups 16 for the G-Pan to be performance ready. To the knowledge of the authors said wheel and cup arrangement is unique to instruments of any nature.

Theoretically, the symmetrical positioning of the abutments 13*b* and suspension wheels 13*c* results in a G-Pan suspension with an average attitude of 0°. In actuality, there will always be somewhat of an imbalance due to the non-uniform distribution in mass over the playing surface 1 and chime 13 on the two sections of the G-Pan drum on either side of the axis of rotation as a result of the non-symmetrical shape formed on the playing surface 1 to create the note areas 1*a* and the normal variations in characteristics of the various materials used on the instrument.

Said non-uniform mass distribution allows for the application of additional masses to change the angle at which balance is achieved, thus facilitating a means for adjustment of the attitude of the G-Pan. The preferred embodiment of the rear attachment 14 on the present invention therefore provides a simple means of adjusting the attitude of the instrument during a performance through the use of attitude offset weights 14*a* that are attached to the rear attachment 14 by means of magnetic strips or double-sided tape. This represents an improvement over the prior art where the attitude of the traditional pan is fixed at the time of manufacture.

Magnetic strips allow for quick and easy adjustment but can only be used on rear attachments 14 made of magnetic material. On the other hand, double-sided tape cannot be as easily moved once affixed but can be applied to rear attachments 14 made of non-magnetic material.

The preferred embodiment of the present invention uses attitude offset weights 14*a* of no more than 0.11 kg/0.25 lb for the smallest instrument, the G-Soprano, affixed to the rear attachment 14 just under the chime 13. The positioning of the attitude offset weights 14*a* just under the chime 13 reduces their visibility and conspicuousness. The greatest attitudinal angle will be achieved if all attitude offset weights 14*a* are placed midway between the suspension wheels 13*c*. Weight selection of the attitude offset weights 14*a* depends on the actual weight distribution on the G-Pan and the range of attitude adjustment required.

The traditional instrument is suspended by a string, cord, twine or similar contrivance to a support stand and is allowed to swing freely as notes on the playing surface are struck. This free swinging motion has become a norm in steelpan performances as it allows a great degree of freedom of expression. The use of a suspension wheel 13*c* to support the G-Pan and provide the free swinging motion during a performance is believed to provide significant improvements.

Figure 6:
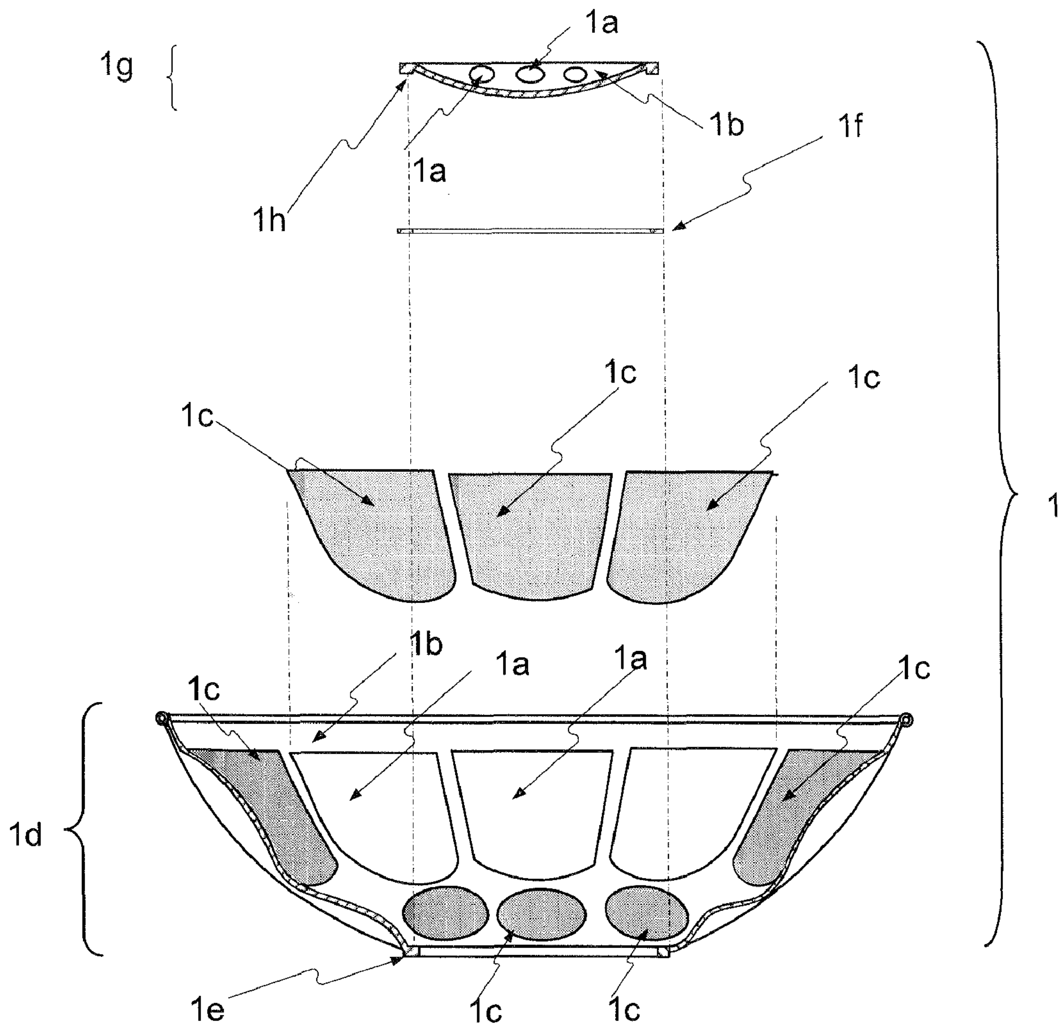
FIG. 6 is an exploded view showing the detailed construction of a preferred embodiment of the playing surface, of a single drum of the ensemble of the present invention

Attention is now drawn to FIG. 6 which shows a cutaway side view of the preferred embodiment of the playing surface 1 of the G-Pan. Unlike the prior art, the preferred embodiment of the playing surface 1 is compound in nature having four separate parts. These are the main bowl 1*d*, an isolation gasket 1*f*, a secondary bowl 1*g* and note covers 1*c*.

The secondary bowl 1*g* is attached to the main bowl 1*d* by the isolation gasket 1*f* which is made of industrial grade double sided tape such as commercially available 3M VHB. In the preferred embodiment of the present innovation, the secondary bowl 1*g* is inserted on an appropriately sized countersunk ring on the inner side of the bowl that forms the playing surface 1 so as to preserve the continuity of the playing surface 1.

The main bowl 1*d* is created by sinking sheet metal of circular form with a diameter of 66.04 cm/26 in to the required depth. After sinking, a hole of diameter of 20.00 cm/8.00 in is cut at the middle of the playing surface 1. The perimeter of said hole is then counter sunk to a depth of 0.32 cm/0.125 in and a width of 0.66 cm/0.26 in. A 0.32 cm/0.125 in thick circular flange 1*e* of inner diameter 20.00 cm/8.00 in and width 0.64 cm/0.25 in is then welded into the sunken perimeter of the hole.

The secondary bowl 1*g* is formed with a similar matching flange 1*h*. The secondary bowl 1*g* material ranges, depending on the musical range of the drum, from 0.35 mm/0.13 in for the G-Soprano to 0.7 mm/0.26 in thick for the G-6Bass. The secondary bowl 1*g* is fabricated by first welding a 0.64 mm/0.25 in thick circular flange 1*h* of inner diameter 20.00 cm/8.00 in and width 1.25 cm/0.50 in to a 1.00 mm/0.04 in thick circular sheet metal blank of diameter 22.54 cm/9.00 in. The portion of the sheet metal blank that is not attached to the flange 1*h* is then sunken to create the required shape profile on the secondary bowl 1*g*. The secondary bowl 1*g* is then ground to attain the desired thickness profile.

The secondary bowl 1*g* can be thought of as a miniature steelpan that is tuned to the highest notes of the drum. For the preferred embodiment of the G-Soprano pan, this would correspond to the sixth octave, for example. The use of material that is thinner than that used for the main bowl 1*d* and hardened by heat and chemical treatment provides an improved medium for creation of notes on the higher register of each drum. Said heat and chemical treatment are processes known to those skilled in the art of metallurgy. Hardening of the material increases the residual tension in the steel and thus allows for higher vibration frequencies just as tightening a string on a guitar increases the generated pitch.

The flanges 1*e*, 1*h* can serve as stiffeners for the main bowl 1*d* and secondary bowl 1*g*.

The isolation gasket 1*f* serves the very important function of decoupling the vibrations of main bowl 1*d* from the secondary bowl 1*g* while acting as an effective mechanical fastener. This decoupling function is vital as experience has shown that the innermost notes of the traditional steelpan are difficult to fabricate to a high level of musical quality due to the strong degree of coupling that exists between these notes and the entire structure. The high degree of coupling arises from the fact that these notes tend to be quite stiff as a result of the residual tensions required to generate the higher pitches.

The fact that the innermost, higher pitched notes tend to be small, typically ranging from 5.08 cm/2.00 in to as small 3.81 cm/1.50 in for the traditional tenor steelpan, creates difficulties in tuning as well as in performance as great skill is required to accurately hit these small notes in fast musical passages. Moreover, acoustic wave reflections on the playing surface, quite apart from triggering other resonators on the playing surface 1, can result in noticeable echoing due to the size of the playing surface and the corresponding distance said acoustic waves must travel before impacting on the hard boundary established by the chime 13. Indeed, interferometry measurements of vibration levels often reveal other parts of the playing surface 1 that vibrate at the modal frequencies of some innermost notes, sometimes at higher vibration levels than the notes themselves.

The use of a secondary bowl 1*g* overcomes these problems by creating a smaller surface for which the relevant geometries can be more tightly controlled. The smaller surface of the secondary bowl 1*g* also acts to reduce the effect of acoustic reflections within the secondary bowl 1*g* material as the distance traveled by acoustic waves is far less than is the case in the prior art.

The use of thinner material to form the secondary bowl 1*g* facilitates a modest increase in note size as the mass of the note on the traditional instrument can now be distributed over a larger area. On this basis of mass conservation, a reduction in thickness by a factor, k, would require an increase in area on the secondary bowl 1*g* by the same factor k and a corresponding increase of $\sqrt{k}$ in any note dimension.

Given that the typical thickness of the center portion of a traditional tenor is 0.6 mm/0.024 in, and assuming a secondary bowl thickness of 0.35 mm/0.015 in, the corresponding increase in note dimension should be of the order of 30%.

The compound design is therefore seen to facilitate the creation of a full octave of notes on the G-Soprano that extend the upper musical range of what obtains in the prior art. In addition, as said notes are as much as 30% larger than what obtains on a traditional tenor pan, musical performance is improved as the notes are easier to strike and the sound produced of these larger notes will be louder.

On the G-Mid and G-Soprano pans note clusters that are radially opposite can result in a level of dissonance as a consequence of energy transmission between said notes. As such, there is a need to implement mechanisms to acoustically separate the notes and so reduce the sound energy transfer across the center of these instruments.

As is the case in the prior art, notes may be separated by rigid areas that are not tuned, grooves, holes, slots, selective localized heat treatment of the areas between the notes and rigid attachments on areas of the support web 1*b* in the vicinity of the notes.

By Newton's first law of motion, $$F=ma$$

where F is the applied force, m is the mass to which the force is applied and a the resulting acceleration. Thus the addition of mass by a given factor, x, results in a reduction in acceleration by the same factor, x, for the same applied force. This results in lower levels of vibration, the amount of which can be estimated by the factor to which the mass in a particular section of the support web 1*b* has been increased.

For a spring with stiffness k and a given mass, m, it is known that the resonant frequency of the motion of the mass when hung from the spring is given by $$f_r = \sqrt{\frac{k}{m}}$$

Thus the addition of mass also reduces the resonance frequencies attributed to non-musical modes.

The current invention therefore provides higher levels of inter-note isolation and separation by the selective addition of mass, termed mass loading by those skilled in the art of vibration control, as a means of vibration absorption treatments in the support web 1*b* of the playing surface 1. Masses used for this purpose may be concentrated at certain points of the support web 1*b* or distributed across said support web 1*b*. Said treatment also gives the benefit of suppressing unwanted high pitch non-musical resonances that are typical on the traditional instrument.

The use of commercial vibration absorbing treatments such as Dynamat and Dynamat Xtreme further enhances vibration damping properties of increased mass through the use of materials that employ friction to convert vibration energy into heat. Said energy would have otherwise been converted to sound.

In the preferred embodiment of the present invention, notes on the main bowl 1*d* secondary bowl 1*g* are separated in the traditional manner by the support web 1*b*. Said support web 1*b* is enhanced for this purpose by localized heat or chemical treatment to increase the rigidity of the structure, said treatment being well known to those skilled in the area of metallurgy. Furthermore, vibration absorption treatments are also applied to the support web 1*b*. The amount of mass and vibration absorption treatment required is determined from the degree of note coupling as measured using laser interferometry or other techniques known to those who are skilled in the art of vibration measurement.

A wide range of materials can be used for the playing surface 1. The essential properties of the materials are (a) high fatigue performance (b) an acceptable resonance plateau (c) a linear relationship between stress amplitude and specific damping energy (d) heat treatable materials where the metallurgical condition can be altered to reduce the internal damping (energy dissipated per unit volume per cycle) (e) isotropic materials where homogeneous damping properties exist.

Possible materials include non-ferrous metals such as (a) Aluminum and its alloys: Aluminum containing up to 2% magnesium, and cold rolled, (b) Copper and Copper Alloys: 99.95% copper, 70% copper 30% zinc, 65% copper 35% zinc (c) Manganese alloys: 88% magnesium, 10% aluminium, greater than 2% manganese, zirconium, zinc, (d) Nickel, Titanium Possible materials also include ferrous metals such as Carbon steels containing 0.04% to 0.15% Carbon with low sulphur (<0.001%) and of drawing quality, carburized steels with up to 0.3% carbon, stainless steels which are Austenitic stainless steels stabilized by niobium or titanium that is non work hardened.

The main bowl 1*d* and secondary bowl 1*g* need not be fabricated from the same material. Indeed, the metals used for each bowl could be selected on the basis of musical range and cost.

The preferred embodiment utilizes Carbon steels containing 0.04% to 0.15% Carbon with low sulphur (<0.001%) and drawing quality for both bowls.

As the current invention features steelpans which offer a wider range of notes than obtained for the prior art there is a corresponding difficulty in the design of the playing stick or mallet which has to be selected so as to excite only the two or three overtones that are traditionally tuned into each note and not to excite the higher partials that will naturally exist on said notes. Said higher partials are usually non-musical in character and lend to an often undesirable metallic sound.

It is recognized that the response to a note to a strike depends on the forcing function, being the profile of force versus time that is applied to the note when struck. Said forcing function is a consequence of the manner in which the player executes the strike as well as the selection of playing stick. It is known that the critical stick properties are its mass and its compliance. These affect the contact time, the time the stick is in contact with the note during a strike and the maximum contact area during the strike.

Low percentages of the impact energy from a strike are imparted to modal frequencies with periods that are shorter than the contact time. Higher fractions are imparted to modal frequencies with periods longer than the contact time.

On the G-Soprano steelpan, for example, fundamental note periods differ by a ratio of 8 to 1 making it difficult for a single stick to effectively excite all the notes on the pan. The inner notes, i.e. those with higher pitches, require a stick with low contact times which would result from having a high compliance, i.e. a "hard" stick. However for a stick of the same mass, the outer notes, i.e. those with the lower pitches, require a stick with longer contact times which would result from having a stick with low compliance heads, i.e. a softer stick.

In the current invention, these requirements are met by (a) utilizing a stick that has the required compliance for the highest pitch notes on the relevant drum and (b) utilizing note covers 1*c* made of a material of appropriate compliance and thickness to cover the lower pitch notes. In essence, this approach removes some of the compliant material from the head of the playing stick and places it on the note. The note covers 1*c* must not be so heavy as to affect the note pitch. They must also be thin enough to ensure adequate contact time when struck with the stick. On the G-Soprano steelpan, for example, note covers 1*c* are applied only to notes on the outermost ring, Ring 0 1*i* and the middle ring, Ring 1 1*j*. These can now be satisfactorily played with a stick or mallet designed for optimum use on the innermost ring, Ring 2 1*k*. This approach can be used even if the specific G-Pan implementation does not utilize the compound design incorporating a secondary bowl 1*g*.

The note covers 1*c* are made of compliant material such as felt, rubber, silicone or other similar synthetic material. However, tests have shown that the note covers 1*c* are most effective when the compliant material of which they are made is of the consistency of felt and not the rubber material or other similar synthetic material used on most sticks. The thickness of felt so applied should be no more than 1 mm/0.025 in.

In addition, the note covers 1*c* should not be bonded to the note as this would affect note flexure and vibration. Instead, the note covers 1*c* are close fitted to the note and held in place only at the sections of the support web 1*b* that form the boundaries of said note. Best results are attained if the material is form fitted to the note so that there are no air spaces between the covering and the note itself.

The preferred embodiment of the playing surface 1 uses felt of thickness between 0.5 mm/0.013 in to 1 mm/0.025 in bonded to the playing surface at the note boundaries using double-sided tape.

Reference is again made to FIG. 5. The skirt of the traditional steelpan is a consequence of the manufacture of the traditional instrument from barrels. However the preferred embodiment of the present invention provides an improvement to the traditional tube design for G-Soprano, G-Second and G-3Mid steelpans through the use of a rear attachment 14 that actually partially covers the rear part of the playing surface.

The use of dome or bowl structures for this purpose provides the required strength and rigidity. The dome attachment could be of solid construction, of rigid meshed or a combination of the two. Careful acoustic design is required to ensure that the musical accuracy and performance characteristics of the instrument are not compromised by the change in acoustic impedance loading presented to the playing surface. For example, inclusion of a carefully designed opening or port on a solid rear attachment 14 on the G-Mid, G-Second and G-Soprano steelpans would serve to minimize the acoustic impedance loading while enhancing the sound projection in a chosen direction.

The G-Pan steelpan design of the present invention, facilitates other rear attachment 14 designs that enhance the acoustic projection of the instrument. Research has shown that the radiation patterns of the traditional steelpan instruments do not favor maximum sound projection to where an audience will typically be located. In particular, on instruments that cover the middle and upper ranges, the radiation patterns tend to be concentrated along the major axis of the drum i.e., towards the top and back of the playing surface. This means that the maximum sound energy is either projected back to the musician or due to the attitude of the instrument in a typical performance, projected to the floor. In the latter case, the sound is either reflected or absorbed depending on the material from which the floor is constructed.

Careful acoustic design of the rear attachment 14 would lead to substantial improvement in the acoustic directivity of the instrument. The major design constraint is that the acoustic impedance loading on the playing surface 1 should not differ significantly from that which obtains for the unloaded playing surface 1. In addition, the rear attachment 14 should provide easy access to the playing surface 1 so as to facilitate re-tuning of the instrument. In practice, variation in acoustic impedance loading can be compensated for to some extent by final tuning of the instrument when the rear attachment is in place.

The G-Pan design philosophy actually therefore allows for three categories of rear attachments 14.

Type 1 attachments are designed solely to protect the rear of the playing surface 1 using a rigid rear attachment 14 design that is characterized by maximum possible damping of the physical structure over the entire audible range of 20 Hz to 20 kHz.

The traditional cylindrical tube design that remains after the body of the original drum is cut, if properly reinforced to minimize or eliminate sympathetic vibration of the rear attachment 14 structure, is an example of a Type 1 rear attachment 14.

For said cylindrical tube design, the required rigidity for suppression of unwanted vibrations can be obtained by a variety of physical means. These include use of vibration resistant materials such as wood, fiberglass, composites or synthetics or metal of appropriate thickness, treatment and material appropriately reinforced to reduce or eliminate the natural vibration modes associated with such a structure. In particular, the open end of the tube must be strengthened so as to reduce or eliminate the natural vibration modes that have antinodes at said open end. Strengthening could be achieved by affixing a reinforcement brace of various designs to the end of the tube. In all cases, said brace should be such as to not restrict access to the rear of the playing surface and so as to facilitate maintenance and re-tuning as the need arises.

Figure 7:
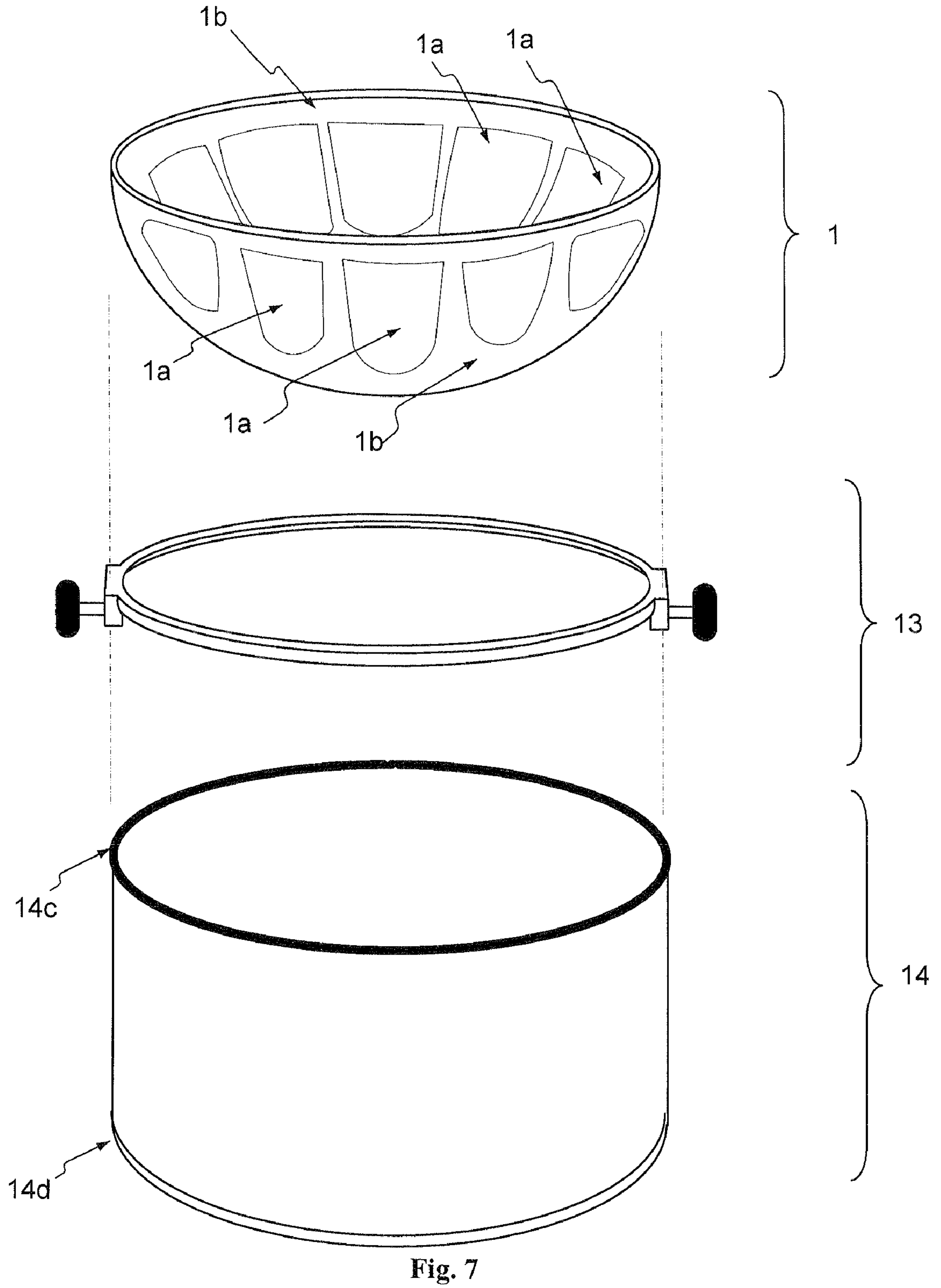
FIG. 7 shows a preferred embodiment of the present invention using Type 1 rear attachments.

FIG. 7 shows a preferred embodiment of a Type 1 rear attachment 14 uses a cylindrical tube design that is fabricated from 1.5 mm mild steel. The steel sheet from which the tube is fabricated is rolled to the appropriate diameter for attachment to the chime 13 and then cut to the desired length. As the Type 1 rear attachment is designed more for protection of the playing surface 1 than for acoustic reasons, lengths should be chosen first to correspond to the depths of the bowl of the playing surface 1 but could otherwise follow the traditional lengths. For the G-Soprano this should be typically 20.3 cm/8 in but no more than 25.4 cm/10 in. For the G-Second steelpan this should be 25.4 cm/10 in but no more than 35.6 cm/14 in. For the G-3Mid this should be typically 35.6 cm/14 in but no more than 45.8 cm/18 in. For the G-6Bass this should be typically 86.36 cm/34 in.

A flange 14*c* to the end of the tube that is to be affixed to the chime 13 is used to facilitate attachment to the chime 13. The tube assembly, comprising the tube and flange, is then heat treated to relieve the internal stresses created by the rolling process. The reduction in internal stresses will also tend to reduce the modal frequencies set up by said stresses, in like fashion to the reduction of pitch that occurs with the reduction in string tension in pianos or guitars. The material should have a coarse grain size so as to further enhance the vibration absorption properties of the rear attachment 14.

Attachment of the flange to the chime 13 is effected with nuts and bolts. To eliminate contact noise nuts and bolts are applied every 5 cm/2 in along the flange circumference; in addition a gasket made of cork, rubber, felt or other vibration damping material is used between the flange and chime 13.

Resistance to vibration is further enhanced by corrugating the surface of the steel used thereof. It is known by experts in vibration analysis and control that said corrugation rings perform the role of a brace that provides resistance to flexure in sheet metals. The ridges forming the corrugation thus formed should be 2.54 cm/1.00 in high with a maximum width of 2.54 cm/1.00 in and spaced no more than 7.62 cm/3 in apart. The inner surface of the tube should is coated with commercially available vibration absorbing mats or coatings such as Dynamat Extreme.

The end of the tube opposite to the playing surface is left open and is reinforced with a ring 14*d* fitted onto the circumference. Said ring 14*d* is made of 1.25 cm/0.50 in hollow circular section mild steel. The minimum thickness of steel used for the ring and is ANSI Schedule 40.

Type 2 rear attachments 14 are designed to protect the rear of the playing surface 1 while at the same time enhancing the sound radiation characteristics of the G-Pan through appropriate design of said rear attachment 14 to act as an effective radiator of sound energy over the musical range of the instrument to which it is attached. This category is divided into two sub-categories.

Type 2a rear attachments 14 use resonators of various designs tuned to some or all of the notes that are present on the relevant instrument. An ideal frequency response of a Type 2a rear attachment 14 would therefore consist of resonance peaks solely at the various note frequencies present on the relevant instrument. Said resonators used in Type 2a rear attachments 14 would noticeably change the timbre of the instrument and result in increased loudness levels.

Type 2b rear attachments 14 employ a rear attachment 14 structure that ensures uniform sound level intensity radiation from said rear attachment 14 across the audible spectrum. The ideal frequency response of a Type 2a rear attachment 14 would therefore avoid any significant resonance characteristics but be band pass in nature, having a flat response across the musical range of the instrument and rolling off below and above the lower and upper frequency limits. Said Type 2b rear attachments 14 would not employ as extreme a damping as Type 1 rear attachments 14 but would still exhibit relatively low levels of vibration at all frequencies of excitation, compared to Type 2a rear attachments 14 for which vibration levels peak at the designed resonant frequencies. Effective sound radiation would be as a consequence of the large surface area of the rear attachment.

Figure 8A:
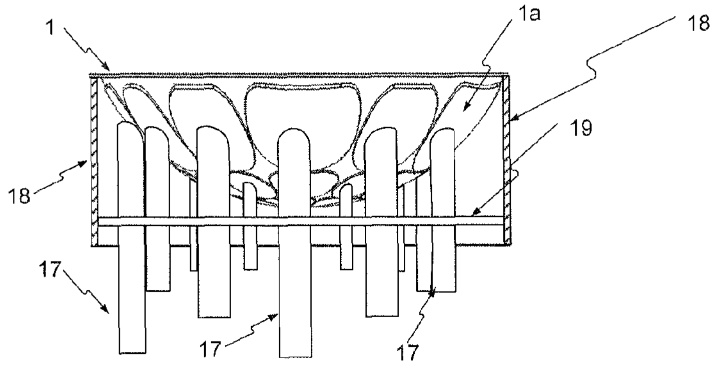
FIG. 8 shows a preferred embodiment of the present invention using tube clusters.
Figure 8B:
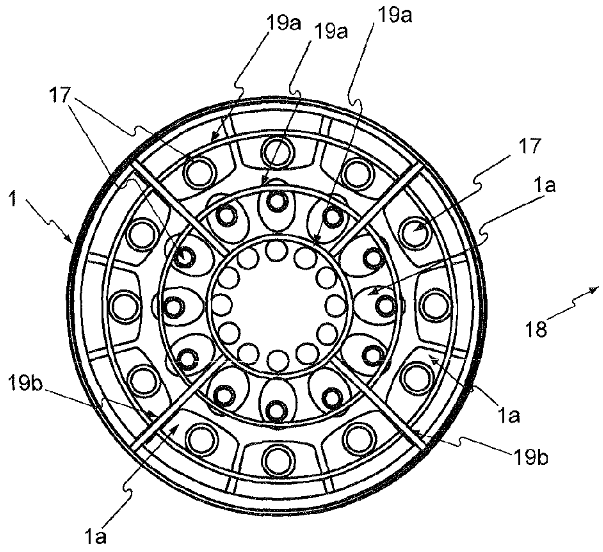
Figure 8C:
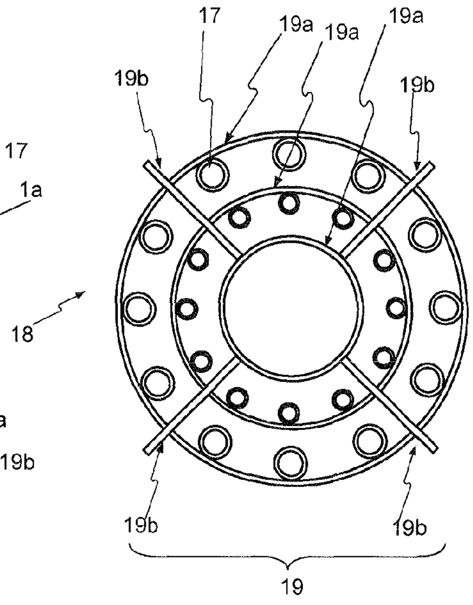

The preferred embodiment of a G-Soprano steelpan with a Type 2a rear attachment 14 uses a cluster of tubes 17 as shown in FIG. 8. FIG. 8*a* shows the side view with the outer shell 18 of the attachment cut away to expose the cluster of tubes 17 within. The outer shell is exactly like the traditional single tube Type 1 rear attachment 14 already described. The tube cluster comprises a group of open ended tubes 17 of small diameter, typically 5.08 cm/2 in to 10.16 cm/8 in. The length of each tube 17 is set so as to ensure that the tube resonance corresponds to the fundamental note frequency.

FIG. 8*b* shows the rear view of the G-Soprano steelpan with a rear attachment 14 containing a cluster of tubes 17. The Figure illustrates the inclusion of a frame 19 to which the tubes are bolted. The frame 19 comprises concentric circular braces 19*a* held together by radial braces 19*b*. Both circular braces 19*a* and radial braces 19*b* are made of aluminum or steel of hollow square or hollow circular cross section of 1.25 cm/0.5 in cross sectional diameter. The frame is itself bolted to the outer shell 18.

The formula relating resonant frequencies and tube geometry for an open tube is known to be $$f_n = \frac{nv}{2(L + 0.3d)}$$

where $f_n$ is the nth resonant frequency, n is a positive integer, d is the tube diameter, L the tube length and v the velocity of sound in air. The factor 0.3d is an end correction factor used to compensate for dispersion of the sound at the end of the tube. The factor L+0.3d therefore corresponds to a ½ wavelength of the note frequency.

The formula applies for tube diameters that are smaller than ¼ wavelength of the frequency applied. For the G-Soprano pan this varies from 33.02 cm/13 in to 4.06 cm/1.6 in. The preferred embodiment of the Type 2a rear attachment 14 as applied to the G-Soprano steelpan uses 5.08 cm/2.00 in diameter tubes for Ring 0 1*i*, 2.54 cm/1.00 in tubes for ring 1 1*j* and 1.27 cm/0.5 in tubes for Ring 2 1*k*. This selection results in tubes of length varying from 71.48 cm/28.14 in to 8.93 cm/3.52 in for the G-Soprano pan.

Each tube in the cluster is placed beneath a single note. The diameter of the tube is chosen to cover ¼ of the surface area of the corresponding note and placement is over one quadrant of the note, avoiding any nodal lines. This is so as to minimize the possibility of cancellation of the second and third partials thus maximizing the sound intensity levels at the mouth of the tube.

One major benefit of the tube cluster design is that each individual note is now associated with a unique resonator whereas the skirt on traditional steelpans, Type 1 rear attachments 14 as well as Type 3 rear attachments 14 provide only a single resonator for all notes.

In addition, as the tubes are open on both sides, its resonance modes occur at all multiples of the fundamental resonance frequency and there are no resonance nulls as for the traditional steelpans. These benefits facilitate a more optimal acoustic radiator design.

However, for maximum acoustic effect the tube length required could be quite long. Indeed, for the G-6Bass the longest tube is of 349 cm/135 in long. This problem can easily be addressed by folding the tube as is done on a tuba, for example.

Figure 9:
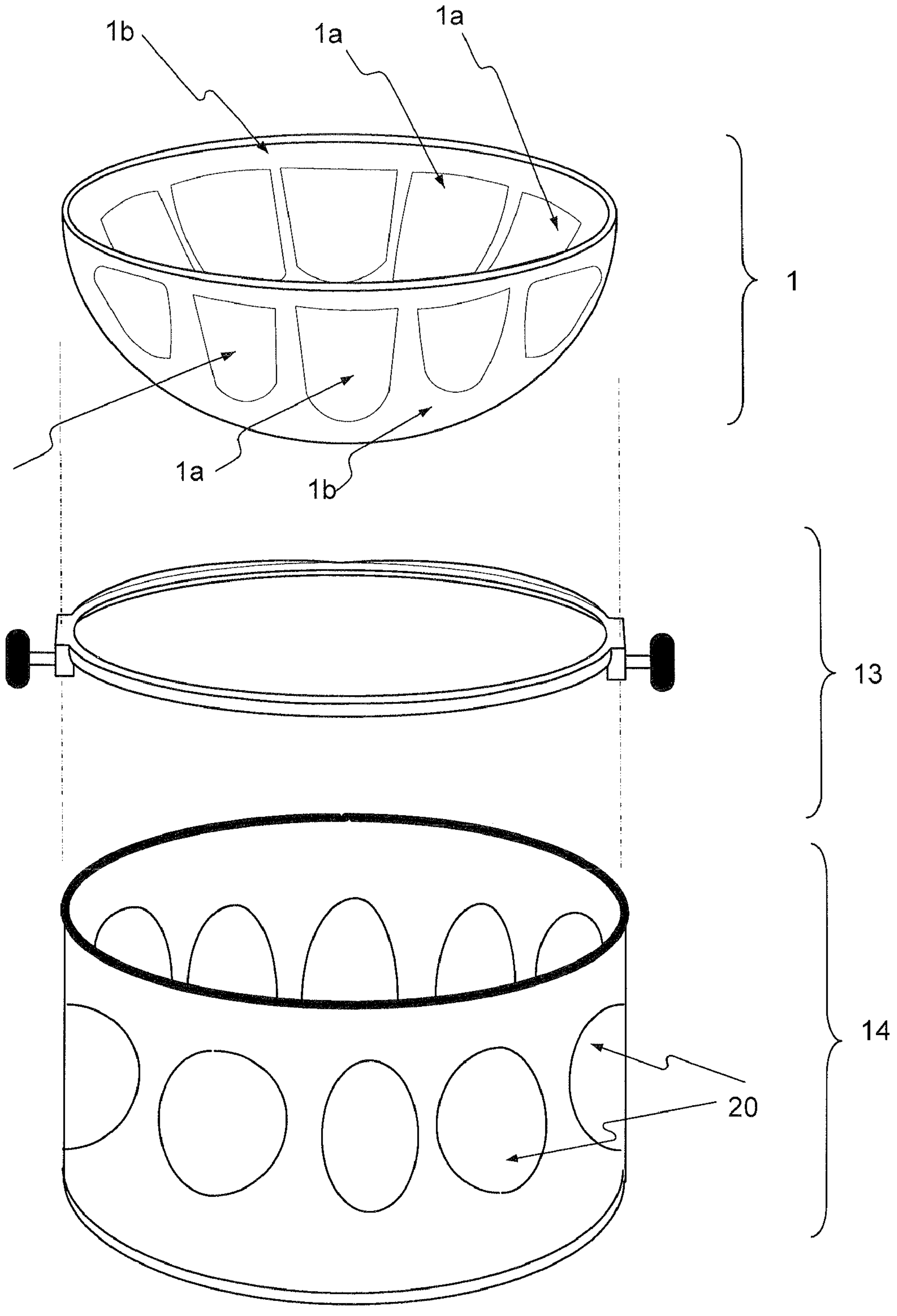
FIG. 9 shows a preferred embodiment of the present invention using tuned rear attachment components or sections.

FIG. 9 shows the preferred embodiment of a G-Pan with a Type 2b a rear attachment 14 that utilizes tuned resonant sections 20 of the structure of the rear attachment 14 that resonate at the fundamental frequency of the notes closest to the rim of the pan. In the preferred embodiment of a Type 2b a rear attachment 14 resonant sections 20 are actually tuned notes similar to those that are formed on the playing surface 1. Alternative implementations include, for example, the use of reeds, cut into the body of the rear attachment 14 and tuned to the required frequency by adjustment of reed length.

The preferred embodiment of Type 2b rear attachment 14 has the advantage over Type 1 and Type 3 rear attachments 14 of readily facilitating the sound projection to be tuned for individual notes on the instrument. Indeed, the tuned sections 20 can be damped or muted to reduce their respective contributions to the sound field allowing for field adjustments that would result in a degree of uniformity in the sound levels of all notes. Damping could be achieved by mass loading, for example. In addition, Type 2b rear attachments 14 have the advantage over Type 2a rear attachments 14 of being easier and cheaper to manufacture as well as being more portable.

Type 3 rear attachments 14 are designed to protect the rear of the playing surface 1 while at the same time enhancing the sound radiation characteristics of the G-Pan through acoustic resonance of the air enclosed by the rear attachment 14 and playing surface 1. A pure Type 3 rear attachment 14 utilizes a very rigid rear attachment structure as in the case of a Type 1 design but does not include the use of solid resonators as is the case of Type 2 rear attachments 14 using, instead, the dynamics of the movement of the air in the enclosure created by the rear attachment 14 and the playing surface 1 to achieve the required radiation characteristics.

It is possible to combine the characteristics of both Type 2 and Type 3 configurations into a rear attachment 14 that includes sound resonators on the body of rear attachments 14 that are designed to factor in acoustic considerations.

Figure 10A:
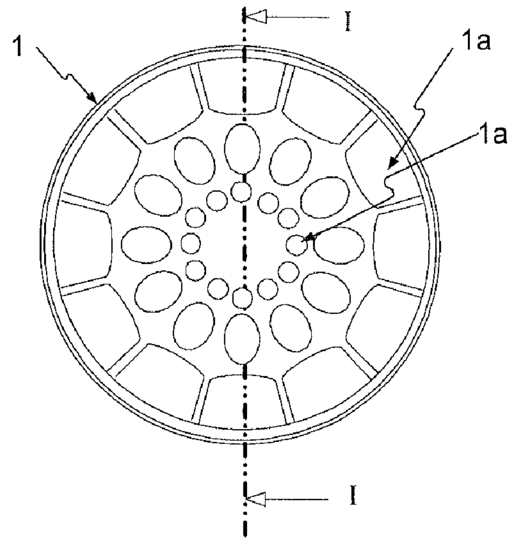
FIG. 10 shows a preferred embodiment of the present invention with a ported rear attachment design.
Figure 10B:
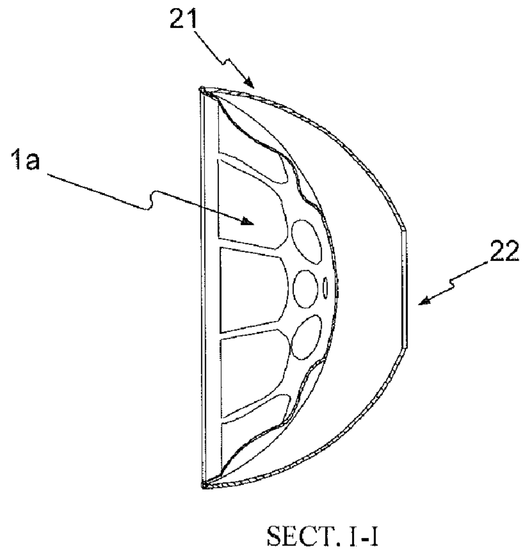
Figure 10C:
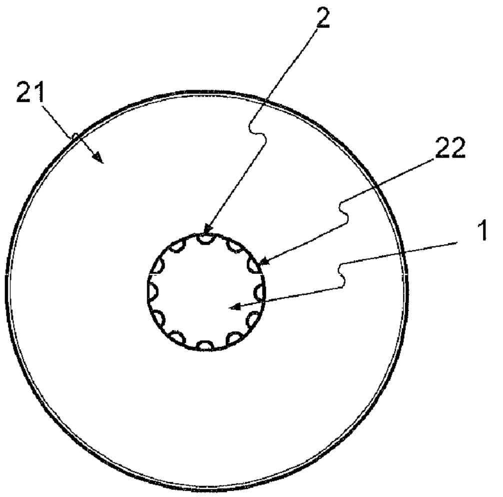

FIG. 10 shows a preferred embodiment of a G-Soprano with a Type 3 rear attachment 21. Said rear attachment 21 is comprised of an inverted dome or bowl structure with a port opening 22 at the very base of the bowl. Said port opening 22 is fabricated large enough to allow for direct radiation from the innermost ring, Ring 2 1*k*, of the G-Soprano, corresponding to the highest musical ranges on the pan. FIG. 10*a* shows the top view, as seen by the player. FIG. 10*b* shows a cutaway view of the side perspective. FIG. 10*c* shows the bottom view. The port opening 22 is clearly shown at the centre where it barely covers the twelve notes 1*a* of Ring 2 1*k* on the playing surface 1.

The volume of the cavity created by the Type 3 rear attachment 21 and the playing surface 1 as well as the port size are designed to enhance the lowest note frequency on the instrument. This design is best suited for the G-Mid and G-6Bass, where it brings a slight improvement in portability, but is just as easily applicable to G-3Mids and G-Soprano steelpans. The design also has to be such that the loading on the notes on the playing surface is minimal.

The G-Pan with Type 3 rear attachment 21 can be modeled as a Helmholtz resonator which is known to have resonant frequency $$f_r = \frac{c}{2\pi}\sqrt{\frac{\pi r_p^2}{V(1.7r_p)}} = \frac{c}{2}\sqrt{\frac{r_p}{1.7\pi V}}$$

Where c is the speed of sound, nominally 340 m/s, $r_p$=d/2 is the port radius, d is the port diameter, and V the volume enclosed by the G-Pan and ported rear attachment. The factor 1.7 $r_p$ is the equivalent length L of the classical resonator which has a volume V that is closed except for an opening to the air through a tube of length L and radius $r_p$.

The corresponding frequency response is bandpass with a Q-factor given by $$Q = 2\pi\sqrt{\frac{V(1.7r_p)^3}{(\pi r_p^2)^3}} = 2\sqrt{\frac{4.9V}{\pi r_p^3}}$$

where $$Q = \frac{f_r}{B}$$

where B is the 3-dB bandwidth of the resonator.

Figure 11:
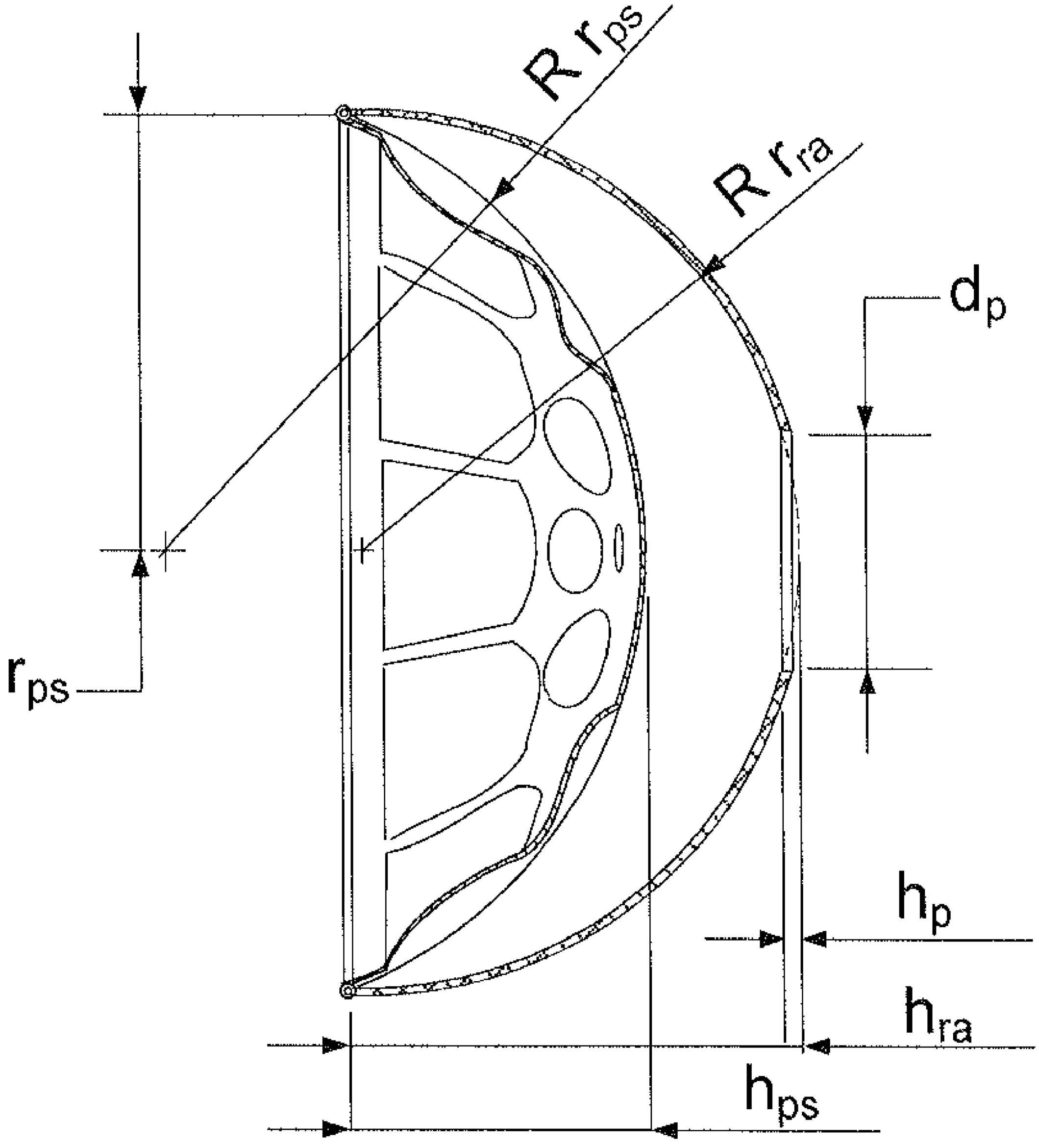
FIG. 11 shows a side view of a preferred embodiment of the present invention with ported rear attachment and illustrates the variable nomenclature used in the required calculations.
Figure 12:
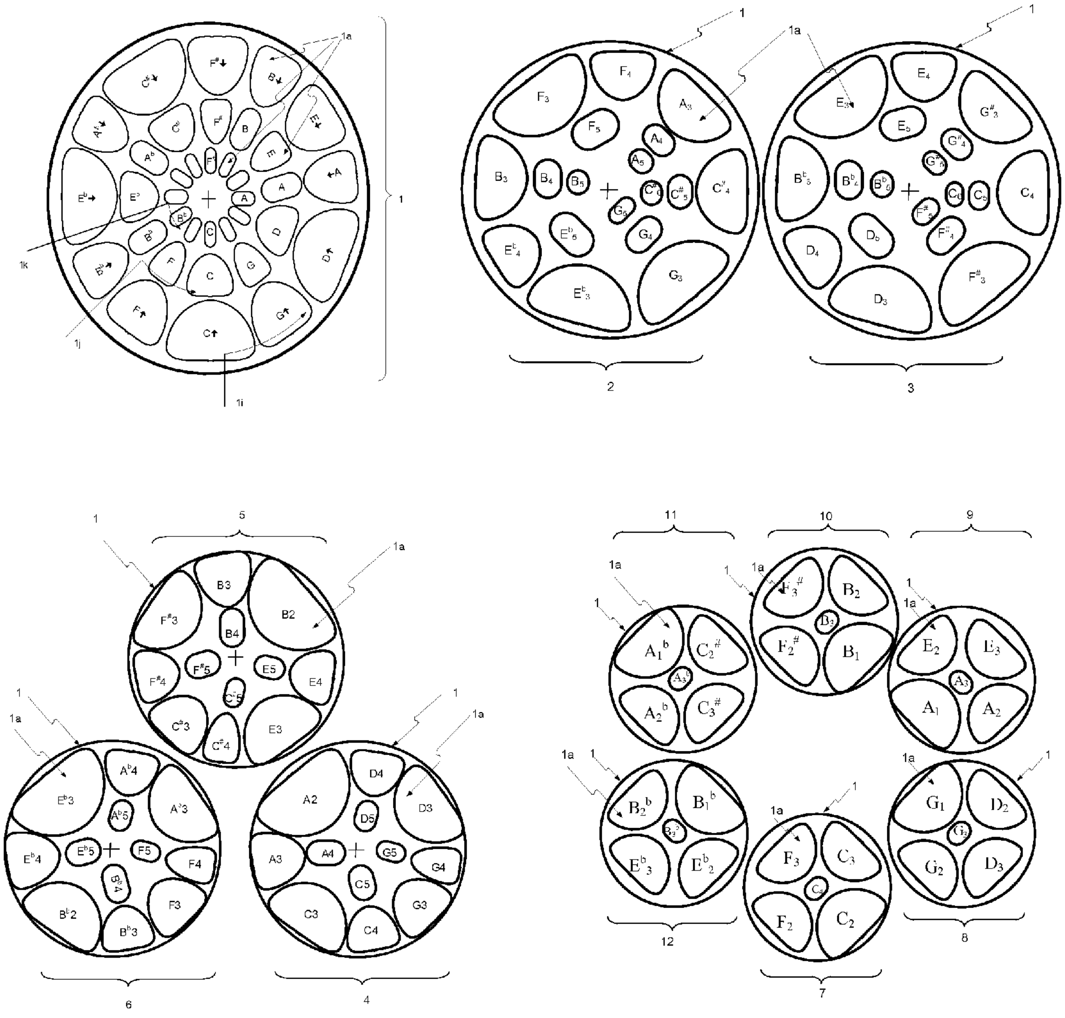
FIG. 12 shows an ensemble comprising the steelpans of FIGS. 1-4, in accordance with an embodiment of the present invention.

In order to apply these formulae, the volume V must be calculated. An estimate of this quantity is obtained by assuming that the playing surface 1 is a spherical cap with base radius r and height $h_{ps}$. It is also assumed that the Type 3 rear attachment 21 is that part of a spherical cap of height $h_{ra}$ that shares the same base as the spherical cap that is the playing surface that remains after removal of a smaller spherical cap of height $h_p$ and base with radius $r_p$. The removal of said spherical cap creates the port 22 with radius $r_p$. To better illustrate the variables defined reference is now drawn to FIG. 11 which applies this assumption in representing the side view of the G-pan with Type 3 attachment 21 shown in FIG. 10 and also illustrates the notation used to establish a formula for V.

The volume V is obtained by subtracting the combined volumes of the spherical cap removed from the Type 3 rear attachment 21 to create the port and the volume enclosed by the playing surface from the total volume of the spherical cap from which the Type 3 rear attachment 21 is formed. This is given by $$V = \frac{\pi}{6}[(3r^2 + h_{ra}^2) - (3r^2 + h_{ps}^2) - (3r_p^2 + h_p^2)]$$

The aforementioned describes the equations relevant to the spherical Type 3 ported rear attachment 21. A preferred approach to the design of the spherical Type 3 ported rear attachment 21 would be to first choose suitable values for Q-factor, Q, and resonant frequency, $f_r$. The required port radius and instrument volume can be calculated from $$r_p = \frac{1.66c}{\pi Q f_r}$$

and $$V = \frac{0.24c^3}{\pi^2 Q f_r^2}$$

Q, $f_r$ should be chosen so that $$Qf_r \geq \frac{\pi r_{pmax}}{1.66c}$$

where $r_{pmax}$ is the maximum allowable port radius; this should be typically 25% of the radius of the base of the spherical cap that forms the playing surface 1 or less to ensure Helmholtz-like behavior as well as realistic solutions.

The inequality shows that the trade-off that must be considered in selecting Q and $f_r$. Since the Helmholtz resonator is essentially a single frequency resonator, one strategy is to align set $f_r$ just above the lowest note frequency of the pan and to set Q so that the bandwidth is as wide as possible without significantly reducing loudness at the lower frequencies. A Q-factor of 8.65 results in a 1 semitone bandwidth, while a Q-factor of 2.87, provides a bandwidth of ±3 semitones, with a consequent reduction in loudness at the resonant frequency.

The heretofore mentioned disclosure describes the equations relevant to the spherical Type 3 ported rear attachment 21. A preferred approach to the design of the spherical Type 3 ported rear attachment 21 would be to first choose suitable values for Q-factor, Q, and resonant frequency, $f_r$. The required port radius and instrument volume can be calculated from $$r_p = \frac{1.66c}{\pi Q f_r}$$

and $$V = \frac{0.24c^3}{\pi^2 Q f_r^3}$$

Q, $f_r$ should be chosen so that $$Qf_r \geq \frac{1.66c}{\pi r_{pmax}}$$

where $r_{pmax}$ is the maximum allowable port radius; this should be typically 30% or less of the radius, r, of the base of the spherical cap that forms the playing surface 1 to ensure Helmholtz-like behavior as well as realistic solutions.

The inequality shows the trade-off that should be considered in selecting Q and $f_r$. Since the Helmholtz resonator is essentially a single frequency resonator, one strategy is to align set $f_r$ just above the lowest note frequency of the pan and to set Q so that the bandwidth is as wide as possible without significantly reducing loudness at the lower frequencies. It should be noted that a Q-factor of 8.65 results in a 1 semitone bandwidth, while a Q-factor of 2.87 provides a bandwidth of ±3 semitones with a consequent reduction in loudness at the resonant frequency.

The Type 3 rear attachment 21 is easily shown to improve upon the skirt used in traditional steelpans as well as Type 1 and Type 2a attachments by way of its increased portability. For example, assume that the rear attachment is designed to resonate at the frequency of the lowest note of a G-3Mid steelpan. For a steelpan of diameter 67.3 cm/26.5 in this corresponds to $A_2$ with a fundamental of 110 Hz and requires a tube length of 138.9 cm/54.7 in.

However, it requires a spherical Type 3 ported rear attachment 21 of the sort described with a spherical cap height, $h_{ra}$, of only 34.3 cm/13.5 in. For this design, the playing surface depth is $h_{ps}$=20.3 cm/, the port radius is $r_p$=9.3 cm/3.7 in and the port height of $h_p$=1.3 cm/0.5 in resulting in a Q factor of 18.2. The port radius can be increased to 18.9 cm/7.4 in and the Q-factor decreased to 8.5 while maintaining the same resonant frequency by placing a cylindrical tube of length 10.6 cm/4.2 in and diameter 67.3 cm/26.5 in between the playing surface and the aforementioned rear attachment. The modified rear attachment doubles the enclosed volume and results in an overall length of 44.9 cm/17.7 in.

Alternatively, the Type 2a tube cluster design and Type 2b rear attachment 14 provide more versatility in tuning the radiation from each note on the instrument as each note has its own resonator. Moreover, unlike the skirt used in traditional steelpans, the preferred embodiment of a G-pan with a Type 3 rear attachment 21 displays only a single resonance and therefore exhibits no resonance nulls in its frequency response and is therefore more suited as an acoustic resonator.

The Type 3 rear attachment 21 is easily shown to improve upon the skirt used in traditional steelpans as well as Type 1 and Type 2a attachments by way of its increased portability. For example, a G-3Mid with a lowest note of $A_2$ corresponding to a fundamental of 110 Hz, requires tube lengths of up to 151 cm/60 in length. However, it requires a spherical Type 3 ported rear attachment 21 of the sort described with a spherical cap height of only 38.1 cm/15 in. On the other hand, the Type 2a tube cluster design and Type 2b rear attachment 14 provide more versatility in tuning the radiation from each note on the instrument as each note has its own resonator. Moreover, unlike the skirt used in traditional steelpans, the preferred embodiment of a G-pan with a Type 3 rear attachment 21 displays only a single resonance and therefore exhibits no resonance nulls in its frequency response and is therefore more suited as an acoustic resonator.

It is an object of the present invention that the preferred embodiment of steelpans in the G-Pan ensemble shall have playing surfaces that are 67.31 cm/26.50 in. in diameter an increase of 11.43 cm/4.5 in over what obtains in the prior art thus facilitating the generation of musical sound at higher sound intensity levels.

A further object of the present invention, is that as a direct consequence of the use of larger drums, the G-Pan ensemble of steelpans shall offer a musical range which spans the musical range $G_1$ to $B_6$ and thus improve on the known instruments by eight (8) semitones, in as much as traditional acoustic steelpans span the musical range $A_1$ to $F_6$.

The effect of an increased size of playing surface on the number of notes it can bear, in particular, its ability to carry 3 note octaves, are mathematically supported as follows:

1. In general a larger playing surface would support a larger number of notes as note pitch is largely dependent on note surface area, and these are fairly constant over the range of tuners. A B1 note is of average dimension 35 mm×45 mm. This drops by roughly 94% for each semitone increase in pitch, according to "*The steel drums of Kim Loy Wong: an instruction manual to accompany the Folkways records FI*-8367 *and FS*-3834 *and the movie, "Music from oil drums"*. Seeger, P. and Loy Wong, K., New York: Oak Publications, 1961. A better fit has been found to be 0.93.

2. "What is the lowest pitch a given drum can support if it is to carry 36 notes?"

Let J be the semitone interval from B1 corresponding to the lowest note on the drum.

$A_{B1}$ be the area of the B1 note (as above)

A be the playing surface area of a drum of radius r and depth d.

F be a parameter defined by the geometric series $$F = \sum_{i=J}^{i=J+35} \alpha^i = \alpha^J \sum_{i=0}^{i=35} \alpha^i = \alpha^J \left( \frac{1-\alpha^{36}}{1-\alpha} \right) \quad (1)$$

where α is the average ratio of areas of notes 1 semitone apart. Observation of the average size of notes in the range B1 to B5, α=0.93 gives a better fit than the α=0.94 as reported in 1. Note that the ensuing equations are very sensitive to the value of α. Note also that the last expansion in the formula above is derived from the well known formula for the sum of a geometric progression.

A typical playing surface of a steeldrum can be modeled as a spherical cap which is known to have surface area $$A = \pi(r^2 + d^2) \quad (2)$$

From the above, the area covered by all 36 notes on a single drum, if they can fit is $$A_J = FA_{B1} \quad (3)$$

IF we allow 10% of the surface area for the web support area of the playing surface, it is therefore seen that the total surface area of the playing surface is given by $$A = 1.1AJ = 1.1FA_{B1} \quad (4)$$

Expanding by substituting for F $$1.\ A = 1.1A_{B1}\alpha^J \left( \frac{1-\alpha^{36}}{1-\alpha} \right) \quad (5)$$

Equation 5 then allows us to relate the area required to support 36 notes starting from a note with pitch J semitones above B1. From Equation 2

$$r = \sqrt{\frac{A}{\pi} - d^2} \quad (6)$$

For a tenor pan or G-Soprano, it is known that the largest comfortable depth is about 10" or 25.4 cm. Using this value of depth one can obtain the following estimates for playing surface diameter for lowest notes as indicated for α=0.93:

| NOTE | $G^{\#}_3$ | $A_3$ | $B^b_3$ | $B_3$ | $C_4$ |
|---|---|---|---|---|---|
| J | 21 | 22 | 23 | 24 | 25 |
| A, $cm^2$ | 4996.13 | 4646.40 | 4321.16 | 4018.67 | 3737.37 |
| r, cm | 34.32 | 32.65 | 31.03 | 29.44 | 27.87 |
| r, cm | 13.51 | 12.86 | 12.22 | 11.59 | 10.97 |
| d, cm | 68.63 | 65.31 | 62.06 | 58.87 | 55.75 |
| d, in | 27.02 | 25.71 | 24.43 | 23.18 | 21.95 |

From this we see that, given the variability in note size from one tuner to the other, we should be able to design a G-Soprano starting from $C_4$ to accommodate 3 octaves. Note that:

1. the diameter shown for $C_4$ is just about that of a traditional pan, i.e. 22 inches. This gives a good reference point and further confidence in the assumption α=0.93.

2. A diameter of 26.5" allows for a G-Soprano starting from just below $A_3$ but above $G^{\#}_3$. An average tuner can, in fact, by plating with the size of the web support, use this size to go down to as low as $G^{\#}_3$ or $G_3$.

The above provides support, not just for the use of a playing surface of increased size, but for the size range specified herein for the G-Pan playing surface.

Yet a further object of the present invention is that the G-Pan ensemble of steelpans, shall offer significantly enhanced capabilities by use of only two note layout templates, an improvement over the prior art in which the note layout philosophy varies significantly resulting in an increase in flexibility in performance, as players can now more easily adapt to any steelpan in the G-Pan assemblage.

Still another significant object of the present invention is that for all steelpans which have the notes distributed over one, three, or six drums, the G-Pan ensemble utilizes a note layout template that preserves the relative note placement of the circle of fourths and fifths.

Moreover a further object of the present invention is that for all steelpans on which the notes must be distributed over two, or four drums, the G-Pan ensemble shall employ a note layout template, that is based on the two whole tone scales that complement each other, in any given contiguous octave of notes. Another object of the present invention, is that the G-Pan ensemble of steelpans shall utilize only four preferred distinct instruments, the G-6Bass, G-3Mid, G-Second and G-Soprano, to cover the aforementioned musical range $G_1$ to $B_6$, whereas traditional steelpans utilize as many as eleven (11) distinct instruments or more, to cover the more limited musical range $A_1$ to $F_6$, the current invention therefore improving on the prior art, by removing the clutter which results from having eleven steelpan instruments to cover a smaller musical range.

Yet another object of the present invention, is that the preferred embodiment of the G-6Bass steelpan shall cover the musical range $G_1$ to $C_4$, a total of 30 notes or 2½ octaves, on 6 drums and therefore exceed the combined ranges of the traditional nine-bass and six-bass steelpans thus providing for a more compact instrument in the bass range that is more portable than what obtains in the prior art, while improving performance versatility by reducing the need for transposition, as is often required in the prior art.

Still another object of the present invention is that the preferred embodiment of the G-3Mid steelpan shall cover the musical range $A_2$ to $A^b_5$, a total of 36 notes or 3 octaves, on 3 drums. The G3-Mid therefore covers the baritone to alto range and exceeds the combined ranges of the 3-cello, 4-cello and double guitar steelpans as well as a significant amount of the quadraphonic steelpan and tenor bass steelpan musical ranges, thus providing for a more compact instrument in the baritone range, that is more portable than what obtains in the prior art, while improving performance versatility by reducing the need for transposition, as is often required in the prior art.

Moreover as a further object, although the preferred embodiment of the G-3Mid steelpan incorporates three octaves of notes to ensure maximum clarity and musical activity through judicious spacing between notes, the G-3Mid can accommodate as many as 45 notes on its playing surface thus exceeding the typical musical range of the quadraphonic steelpan.

Consummately, another object of the present invention is that the G-3Mid steelpan represents a major departure from the prior art, as its note layout is a distribution of the cycle of musical fourths and fifths over three drums.

A further object of the present invention, is that the preferred embodiment of the G-Second steelpan shall cover the musical range $D_3$ to $C^{\sharp}_6$, a total of 36 notes on 2 drums, since it targets the alto and tenor ranges and exceeds the combined ranges of the traditional double second and double tenor steelpans; thus providing for a more compact instrument in the alto and tenor ranges, that is more portable than what obtains in the prior art, while improving performance versatility by reducing the need for transposition as is often required in the prior art.

Still another object of the present invention, is that the preferred embodiment of the G-Soprano steelpan shall cover the musical range $C_4$ to $B_6$, a total of 36 notes or 3 octaves, on a single drum; while it targets the soprano range and exceeds the combined musical range of the low tenor steelpan and high tenor steelpan, thus providing for a more compact instrument in the soprano range, that is more portable than what obtains in the prior art, while improving performance versatility by reducing the need for transposition, as is often required in the prior art.

Rear attachments on known steelpans include a single barrel or tube that displays resonances that do not correspond to the fundamental frequencies of all notes on a given drum. The Type 2a rear attachments described herein can enhance sound projection through the application of a tube cluster mechanism that provides a tube resonator for each note on the playing surface. This is a novel approach that enhances the loudness and musical accuracy of the instrument and is not hitherto known.

Since other given modifications and features, which may be varied to fit such particular operating requirements and situations, will become apparent to those skilled in the art, from the herewithin detailed description, considered in conjunction with the accompanying drawings, it is to be understood however, that the present invention is not considered to be limited to the examples chosen for the antecedent purposes of disclosure and therefore covers all changes and modifications, which do not constitute departures from its true spirit and scope, for which reference should be made to the appended claims.

All patents and patent applications cited herein are hereby incorporated by reference herein.

What is claimed is:

1. An ensemble comprising four or fewer acoustic steelpan musical instruments, the ensemble being capable of covering the entire musical spectrum of $G_1$, $G_1^{\sharp}$, $A_1$, $A_1^{\sharp}$, $B_1$, $C_2$, $C_2^{\sharp}$, $D_2$, $D_2^{\sharp}$, $E_2$, $F_2$, $F_2^{\sharp}$, $G_2$, $G_2^{\sharp}$, $A_2$, $A_2^{\sharp}$, $B_2$, $C_3$, $C_3^{\sharp}$, $D_3$, $D_3^{\sharp}$, $E_3$, $F_3$, $F_3^{\sharp}$, $G_3$, $G_3^{\sharp}$, $A_3$, $A_3^{\sharp}$, $B_3$, $C_4$, $C_4^{\sharp}$, $D_4$, $D_4^{\sharp}$, $E_4$, $F_4$, $F_4^{\sharp}$, $G_4$, $G_4^{\sharp}$, $A_4$, $A_4^{\sharp}$, $B_4$, $C_5$, $C_5^{\sharp}$, $D_5$, $D_5^{\sharp}$, $E_5$, $F_5$, $F_5^{\sharp}$, $G_5$, $G_5^{\sharp}$, $A_5$, $A_5^{\sharp}$, $B_5$, $C_6$, $C_6^{\sharp}$, $D_6$, $D_6^{\sharp}$, $E_6$, $F_6$, $F_6^{\sharp}$, $G_6$, $G_6^{\sharp}$, $A_6$, $A_6^{\sharp}$, and $B_6$, wherein the four instruments comprise:

a soprano instrument comprising one drum and configured to span the musical range $C_4$ to $B_6$;

a second instrument comprising two drums and configured to span the musical range $D_3$ to $C^{\sharp}_6$;

a mid instrument comprising three drums and configured to span the musical range $A_2$ to $G^{\sharp}_5$; and a bass instrument comprising six drums and configured to span the musical range $G_1$ to $C_4$; and wherein each instrument has a playing surface having an area of $$S_{instrument} = kS_{B1}\alpha^J\left(\frac{1-\alpha^n}{1-\alpha}\right),$$

where $S_{B1}$ is the area of a $B_1$ note, $\alpha$ is the ratio of the area between consecutive notes, typically 0.93, n is the number of notes on the playing surface and, for the playing surface in the form of a spherical bowl mutatis mutandis, the radius of said playing surface is $$r = \sqrt{\frac{S_{instrument}}{\pi} - d^2}$$

where d is the depth of the bowl that forms the playing surface, and the number of drums of an instrument is given by $n_{drums} \geqq S_{instrument}/S_{soprano}$.

2. The ensemble of claim 1 wherein the soprano instrument has one drum having a playing surface area of $$S_{soprano} = 1.1A_{B1}\alpha^J\left(\frac{1-\alpha^n}{1-\alpha}\right)$$

or at least 4646.4 $cm^2$, a depth of no greater than d=10" or 25.4 cm, and a radius $$r = \sqrt{\frac{S_{soprano}}{\pi} - d^2}$$

being at least 32.7 cm or 12.9 in.

3. The ensemble of claim 1 wherein the second instrument has two drums, each drum having a radius $$r = \sqrt{\frac{S_{soprano}}{\pi} - d^2}$$

being at least equal to the radius of the soprano instrument drum.

4. The ensemble of claim 1 wherein the bass instrument has six drums, the bass instrument having a playing surface area of $$S_{instrument} = 1.05S_{B1}\alpha^J\left(\frac{1-\alpha^n}{1-\alpha}\right)$$

or at least 27535 $cm^2$ and having a radius $$r = \sqrt{\frac{S_{soprano}}{\pi} - d^2}$$

being at least equal to the radius of the soprano instrument drum.

5. The ensemble of claim 1 wherein the playing surface comprises a metal selected from the group consisting of aluminum and its alloys, copper and copper alloys, manganese alloys, magnesium, zirconium, zinc, nickel, titanium, carbon steels and stainless steels that are austenitic stainless steels stabilized by niobium or titanium that is non-work hardened.

6. The ensemble of claim 1 further comprising:

a pair of suspension wheels attached to each drum of each instrument; and a support stand including a pair of support cups, the support cups constructed and arranged to rotatably support the suspension wheels without constraining each instrument to a fixed playing angle, thereby supporting each drum in a free swinging fashion.

7. The ensemble of claim 1 wherein the mid instrument has three drums, the mid instrument having a playing surface area of $$S_{instrument} = 1.1 S_{B1} \alpha^{J} \left( \frac{1 - \alpha^{n}}{1 - \alpha} \right)$$

or at least 11100 $cm^2$ and each drum having a radius $$r = \sqrt{\frac{S_{soprano}}{\pi} - d^2}$$

being at least equal to the radius of the soprano instrument drum.

* * * * *